United States Patent
Jung et al.

(10) Patent No.: US 10,066,958 B2
(45) Date of Patent: Sep. 4, 2018

(54) USER TERMINAL DEVICE FOR DISPLAYING MAP AND METHOD THEREOF

(71) Applicant: SAMSUNG ELECTRONICS CO., LTD., Suwon-si (KR)

(72) Inventors: Jong-woo Jung, Hwaseong-si (KR); In-sik Myung, Incheon (KR); Taik-heon Rhee, Seoul (KR); Dong-bin Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/462,691

(22) Filed: Aug. 19, 2014

(65) Prior Publication Data

US 2015/0051835 A1 Feb. 19, 2015

(30) Foreign Application Priority Data

Aug. 19, 2013 (KR) .................... 10-2013-0097822

(51) Int. Cl.
G01C 21/36 (2006.01)
(52) U.S. Cl.
CPC ..... *G01C 21/3664* (2013.01); *G01C 21/3647* (2013.01)
(58) Field of Classification Search
CPC .............. G01C 21/3664; G01C 21/3647
USPC ............................................. 701/533
See application file for complete search history.

(56) References Cited

U.S. PATENT DOCUMENTS

| 7,110,592 | B2 * | 9/2006 | Kotake ................. G01C 21/26 382/154 |
| 8,200,847 | B2 | 6/2012 | LeBeau et al. |
| 8,204,684 | B2 * | 6/2012 | Forstall ................. G01C 21/20 455/456.1 |
| 9,026,940 | B2 | 5/2015 | Jung et al. |
| 2002/0187831 | A1 * | 12/2002 | Arikawa ................. G07F 17/32 463/29 |
| 2007/0055441 | A1 * | 3/2007 | Retterath ........... G01C 21/3647 701/532 |
| 2007/0067104 | A1 * | 3/2007 | Mays ..................... G01C 21/36 701/437 |

(Continued)

FOREIGN PATENT DOCUMENTS

CN 1880918 A 12/2006
CN 101166952 A 4/2008

(Continued)

OTHER PUBLICATIONS

Search Report, Issued by the International Searching Authority, dated Nov. 27, 2014, In counterpart International Application No. PCT/KR2014/007659.

(Continued)

*Primary Examiner* — Courtney D Heinle
(74) *Attorney, Agent, or Firm* — Sughrue Mion, PLLC

(57) ABSTRACT

A user terminal device is provided. The user terminal device includes a display configured to display a map screen, a detector configured to sense a user manipulation, and a controller configured to, when a location and a direction are determined by the user manipulation on the map screen, display at least one photo image corresponding to the location and the direction of the user manipulation on the map screen.

39 Claims, 37 Drawing Sheets

(56) References Cited

U.S. PATENT DOCUMENTS

| | | | |
|---|---|---|---|
| 2007/0150188 A1* | 6/2007 | Rosenberg | G01C 21/3647 701/431 |
| 2007/0195373 A1* | 8/2007 | Singh | G01C 21/34 358/302 |
| 2007/0198182 A1* | 8/2007 | Singh | G01C 21/3647 701/431 |
| 2008/0312824 A1* | 12/2008 | Jung | G01C 21/3679 701/439 |
| 2009/0005975 A1 | 1/2009 | Forstall et al. | |
| 2009/0093955 A1 | 4/2009 | Geelen | |
| 2009/0125234 A1* | 5/2009 | Geelen | G01C 21/3647 701/533 |
| 2009/0171568 A1* | 7/2009 | McQuaide, Jr. | G01C 21/36 701/411 |
| 2009/0240431 A1* | 9/2009 | Chau | G01C 21/3647 701/532 |
| 2009/0254268 A1* | 10/2009 | Figueroa | G01C 21/3644 701/533 |
| 2009/0289937 A1* | 11/2009 | Flake | G06T 17/05 345/419 |
| 2009/0313124 A1* | 12/2009 | Miranda | G01C 21/3647 705/14.58 |
| 2009/0325607 A1* | 12/2009 | Conway | G06F 1/1624 455/456.3 |
| 2010/0305844 A1* | 12/2010 | Choi | G01C 21/3423 701/533 |
| 2010/0318573 A1* | 12/2010 | Yoshikoshi | G06F 3/04883 707/802 |
| 2011/0098918 A1* | 4/2011 | Siliski | G01C 21/265 701/533 |
| 2011/0283223 A1* | 11/2011 | Vaittinen | G01C 21/3647 715/781 |
| 2011/0313653 A1* | 12/2011 | Lindner | G01C 21/3632 701/523 |
| 2012/0022876 A1 | 1/2012 | LeBeau et al. | |
| 2012/0092266 A1* | 4/2012 | Akella | G01C 21/3664 345/173 |
| 2012/0096403 A1 | 4/2012 | Jung et al. | |
| 2012/0221241 A1* | 8/2012 | Nurmi | G01C 21/20 701/438 |
| 2013/0050131 A1* | 2/2013 | Lee | G08G 1/09626 345/174 |
| 2013/0147844 A1* | 6/2013 | Isozu | H04N 5/232 345/659 |
| 2013/0162665 A1* | 6/2013 | Lynch | G01C 21/3647 345/589 |
| 2013/0325341 A1* | 12/2013 | van Os | G01C 21/3611 701/533 |
| 2014/0288827 A1* | 9/2014 | Iwasawa | G01C 21/3697 701/522 |
| 2014/0365122 A1* | 12/2014 | McGavran | G01C 21/3632 701/533 |

FOREIGN PATENT DOCUMENTS

| | | |
|---|---|---|
| CN | 101197094 A | 6/2008 |
| CN | 101246018 A | 8/2008 |
| CN | 102457617 A | 5/2012 |
| CN | 102804181 A | 11/2012 |
| EP | 1659368 * | 5/2006 |
| KR | 10-2011-0124014 A | 11/2011 |

OTHER PUBLICATIONS

Written Opinion, Issued by the International Searching Authority, dated Nov. 27, 2014, In counterpart International Application No. PCT/KR2014/007659.

Communication dated Mar. 7, 2017, issued by the European Patent Office in counterpart European application No. 14838709.5.

Communication issued by the European Patent Office dated Nov. 6, 2017 in counterpart European Patent Application No. 14838709.5.

Communication dated Apr. 28, 2018, issued by the Chinese Patent Office in counterpart Chinese Application No. 201480045600.8 English translation.

* cited by examiner

FIG. 4
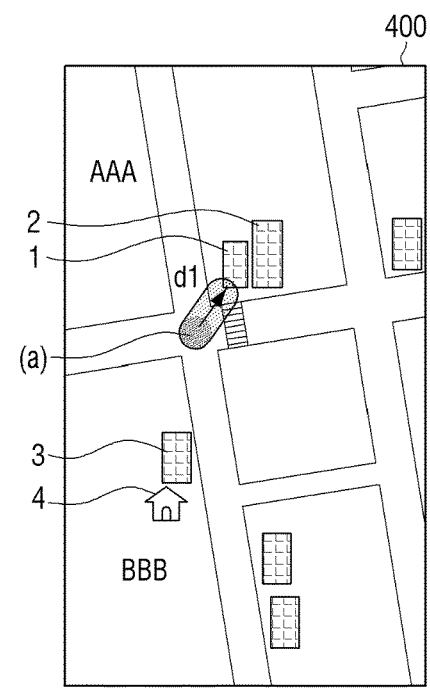
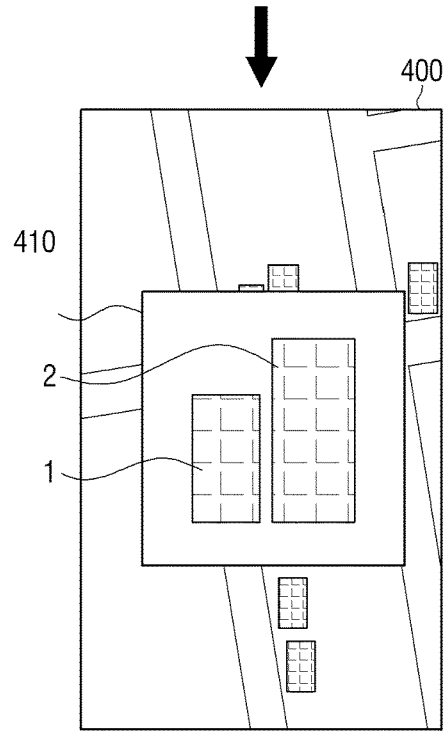

USER TERMINAL DEVICE FOR DISPLAYING MAP AND METHOD THEREOF

CROSS-REFERENCE TO RELATED APPLICATIONS

This application claims priority under 35 U.S.C. § 119 from Korean Patent Application No. 10-2013-0097822, filed on Aug. 19, 2013 in the Korean Intellectual Property Office, the disclosure of which is incorporated herein by reference in its entirety.

BACKGROUND

1. Field

The present exemplary embodiments generally relate to a user terminal device for displaying a map and a method thereof, and more particularly, to a user terminal device which provides an image along with a map and a method thereof.

2. Description of the Related Art

With the development of electronic technologies, various types of user terminal devices are used. To be specific, use of portable devices such as a mobile phone, a Personal Digital Assistant (PDA), a tablet Personal Computer (PC), a laptop PC, a MP3 player, and a navigation device has been greatly increased.

Such user terminal devices have a characteristic that a user is able to install applications which are necessary for the user, and to extend functions thereof conveniently and easily. In particular, as the use of cars has increased, many user terminal devices provide a navigation function.

However, in general, a navigation method in the related art displays only a moving route to a destination set by a user. Accordingly, a problem with the navigation method in the related art is that the navigation method makes it difficult for a user to find a route using only a map when the user encounters conditions such as a complex road, navigating at nighttime, and bad visibility due to rain or fog.

Hence, it is necessary for a user to have a navigation means that is easier and more convenient to use.

SUMMARY

Exemplary embodiments have been provided to address the above-mentioned problems, and an aspect of the exemplary embodiments is to provide a user terminal device which provides an image corresponding to a direction so that a user is able to conveniently use a map, and a method thereof.

A user terminal device according to an exemplary embodiment includes a display configured to display a map screen, a detector configured to detect a user manipulation; and a controller configured to, when a route is input by the user manipulation on the map screen, display a photographic image which is selected based on the route.

Herein, wherein the controller configured to, when a location and the route are input by the user manipulation on the map screen, display a photographic image which is viewable based on the position and a direction corresponding to the route.

Alternatively, wherein the controller configured to, when a location and a direction are input by the user manipulation on the map screen, display a photographic image which is viewable based on the location and the direction.

Herein, when a route on the map screen is inputted by the user manipulation, the controller may display a plurality of photographic images corresponding to a plurality of locations along the route, the images corresponding to a direction of the route at the plurality of locations thereof.

Alternatively, the controller may display the plurality of photographic images sequentially.

When a destination is determined, the controller may display a moving route from a current location to the destination on the map screen, and may also display at least one photographic image in a direction of the moving route on the map screen among the photographic images corresponding to the moving route.

Herein, a text may be drawn by the user manipulation on the map screen, and the controller may determine the destination by recognizing the text, and search a moving route from a current location of the user terminal device to the destination automatically.

In addition, when a line is drawn by the user manipulation on the map screen, the controller may determine the moving route based on a trace of the line.

In addition, the user manipulation may include a pen hover manipulation moving along the moving route, and the detector may detect the pen hovering manipulation, and the controller may display photographic images in a moving direction at each point on the moving route sequentially according to the pen hovering manipulation.

The controller may select points which meet a predetermined condition from the moving route, and the controller may display a photographic image in a direction of the moving route at each selected point.

Herein, the user manipulation may include a touch and a dragging or flicking. When the user manipulation is dragged or flicked in a certain direction on the map screen after it is touched, the controller may determine the location based on the touch point, and determine the direction based on the dragged direction or the flicked direction.

The controller may select at least one of magnification, a size, a display location, and a photographing angle based on at least one from among a touch intensity, a touch area, a touch time, a moving distance, and a moving speed of the user manipulation, and displays a selected photographic image on the map screen additionally.

In addition, the user manipulation may further include a manipulation using a pen.

The device may further include a storage. In this case, the controller may select a photographic image corresponding to the location and the direction from among the photographic images stored in the storage.

In addition, the device may further include a communication unit configured to communicate with a server. In this case, the controller may search and download a photographic image corresponding to the location and the direction from the server, and may display the downloaded photographic image on the map screen additionally.

The device may further include a storage and a communication unit configured to communicate with a server. In this case, the controller may detect the photographic image corresponding to the location and the direction from at least one of the storage and the server selectively, and when a plurality of photographic images are detected, provide a moving image effect by displaying the plurality of photographic images consecutively.

Herein, a share command may be inputted via the detector, and the controller may transmit the photographic image to other user terminal devices by using the communication unit according to the share command.

In addition, the controller may display the photographic image by overlaying the image on the map screen at the location corresponding to the image.

The controller may display the photographic image as a separate screen from the map screen.

A display method of a user terminal device according to an exemplary embodiment includes displaying a map screen, detecting a user manipulation, and when a route is input by the user manipulation on the map screen, displaying a photographic image which is selected based on the route.

The method may further include, when a location and the route are input by the user manipulation on the map screen, displaying a photographic image which is viewable based on the position and a direction corresponding to the route.

The method may further include, further comprising: when a location and a direction are input by the user manipulation on the map screen, displaying a photographic image which is viewable based on the location and the direction.

The method may further include, when a route on the map screen is inputted by the user manipulation, displaying a plurality of photographic images corresponding to a plurality of locations on the route and corresponding to a direction of the route at the plurality of locations.

In addition, the plurality of photographic images may be displayed sequentially.

The method may further include, when a destination is determined by the user manipulation, displaying a moving route from a current location of the user terminal device to the destination on the map screen and displaying at least one photographic image in a direction of the moving route from among a plurality of photographic images corresponding to the moving route on the map screen.

The method may further include, when a text is drawn by the user manipulation on the map screen, determining the destination by recognizing the text, and searching a moving route from the current location of the user terminal device to the destination automatically.

The method may further include, when a line is drawn by the user manipulation on the map screen, determining the moving route based on a trace of the line.

The displaying a photographic image on the map screen may further include, when a user manipulation moving along the moving route is detected, sequentially displaying photographic images in the moving direction at each point on the moving route according to the pen user manipulation.

The user manipulation may include a pen hovering manipulation.

In addition, the displaying the selected photographic image on the map screen may include selecting points from the moving route which meet a predetermined condition, and displaying an photographic image in the moving direction at each selected point.

The method may further include searching a photographic image corresponding to the location and the direction from a storage of the user terminal device or an external server.

When the plurality of photographic images is detected, the displaying may include displaying the plurality of photographic images consecutively like a moving image.

The method may further include, inputting a share command and transmitting the photographic image to other user terminal devices according to the share command.

According to another exemplary embodiment, a navigation service providing system includes a server configured to store photographic images uploaded from the plurality of user terminal devices. In addition, when information on a moving route and a moving direction is transmitted from a user terminal device among the plurality of user terminal devices, the server may search an image photographic in the moving direction at a plurality of points along the moving route from among prestored photographic images, and transmit the searched photographic image to the user terminal device.

According to another exemplary embodiment, a device includes a display which displays at least one image, a detector which detects an input, and a controller which controls the displaying of the at least one image based on the input, where the input corresponds to at least one location and at least one direction.

The location may include a destination for a moving route and the at least one image may include at least one from among at least one photograph and at least one map screen.

The controller may also display the at least one photograph corresponding to various heights with respect to a surface of the ground at the at least one location according to the input.

In addition, the input may be one from among a user touch, a pen, a hovering manipulation, and a voice command.

Yet another exemplary embodiment provides a display method, which may include displaying at least one image, sensing an input, and controlling the displaying of the at least one image based on the input, where the input may correspond to at least one location and at least one direction.

The location may include a destination for a moving route and the at least one image may include at least one from among at least one photograph and at least one map screen.

In addition, the method may further include displaying the at least one photograph corresponding to various heights with respect to a surface of the ground at the at least one location according to the input.

The input may be one from among a user touch, a pen, a hovering manipulation, and a voice command.

BRIEF DESCRIPTION OF THE DRAWINGS

The above and/or other aspects will become more apparent from the following description of the exemplary embodiments with reference to the accompanying drawings, in which:

FIG. 4 and FIG. 5 are views for explaining a method of displaying an image according to a location and a direction selected on a map screen according to an exemplary embodiment;

DETAILED DESCRIPTION

Figure 1:
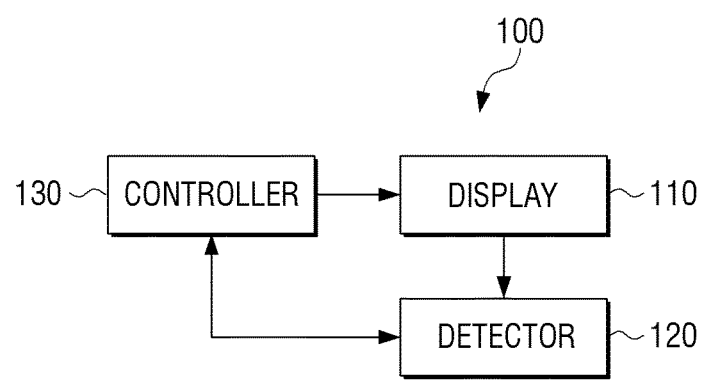
FIG. 1 is a block diagram illustrating a configuration of a user terminal device according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters, and the inventive concept may be embodied in many different forms and should not be construed as being limited to the exemplary embodiments set forth herein. Also, well-known functions or constructions are not described in detail when it is deemed they would obscure the application with unnecessary detail.

It will be understood that, although the terms used in the present specification may be used herein to describe various elements, these elements should not be limited by these terms. These terms are only used to distinguish one element from another.

Hereinafter, the term "unit" refers to a software component, or a hardware component such as FPGA or ASIC, and performs a certain function. However, the "unit" is not limited to software or hardware. The "unit" may be configured in an addressable storage medium and may be configured to be executed by one or more processors. Hence, the "unit" includes elements such as software elements, object-oriented software elements, class elements, and task elements, and processes, functions, attributes, procedures, subroutines, segments of program codes, drivers, firmware, micro-codes, circuits, data, databases, data structures, tables, arrays, and variables. The functions provided in the elements and the units may be combined into a fewer number of elements and units or may be divided into a larger number of elements and units.

FIG. 1 is a block diagram illustrating a configuration of a user terminal device according to an exemplary embodiment. According to FIG. 1, a user terminal device 100 includes a display 110, a detector 120, and a controller 130. The user terminal device 100 refers to various types of electronic devices which may be used by a user. To be specific, the user terminal device 100 may be implemented as various types of devices such as a mobile phone, a tablet PC, a laptop PC, a PDA, a MP3 player, an electronic picture frame device, a TV, a PC, a navigation device, a kiosk, and the like.

In FIG. 1, only components involved in operations according to various exemplary embodiments are illustrated, and illustrations for the other specific components are omitted. The display 110 may display various types of screens such as a home screen, an icon screen, a list screen, an application execution screen, a web browser screen, a content play screen, and the like. In addition, the display 110 may display other various types of screens than those screens disclosed above.

Specifically, when a navigation function is executed, the display 110 may display a map screen.

The detector 120 may detect a user manipulation which is performed with respect to the display 110. A user manipulation refers to an operation of controlling functions of the user terminal device 100 by using an input means such as a user's body or a pen. The user manipulation may be performed in various manners such as a touch manipulation, an approach manipulation, a button manipulation, a voice manipulation, a motion manipulation, and the like.

In case of a touch manipulation method, the detector 120 may be implemented as various types of touch detectors such as a capacitive type, a resistive type, a piezoelectric type, and the like. A capacitive type refers to a method of, when a part of a user's body is touched on a surface of the display 110, sensing micro electricity excited by the user's body thereby calculating a touch coordinate by using a dielectric which coats the surface of the display 110. A resistive type refers to a method of, when a user touches a screen, sensing a current which flows as two electrode plates embedded in the display 110 are placed in contact, that is, an upper plate and a lower plate on the touch point contact with each other thereby calculating a touch coordinate.

When a user touches and drags a random point on a map screen, the detector 120 may detect the touch point and a dragging trace thereof. The detector 120 may also detect a user manipulation using another input means, such as a pen. When an input means is a stylus pen including an inner coil, the detector 120 may include a magnetic field detector capable of sensing a magnetic field which varies by the inner coil of the stylus pen. Hence, the detector 120 may detect an approach manipulation, that is, a hovering, as well as the touch manipulation. A configuration of the detector 120 will be explained in detail below.

When a user manipulation is detected, the detector 120 sends the detected result to the controller 130. For example, when a user touches a point on a screen by using a finger or a pen, the detector 120 notifies an x-coordinate value and a y-coordinate value of the touch point to the controller 130. When the user moves the touch point while maintaining the touch, the detector 120 notifies a changing touch coordinate value to the controller 130 in real time. As specified above, the detector 120 may detect a close approach even though there is no direct touch.

The controller 130 performs a control operation which corresponds to the detected result provided by the detector 120. For example, when it is determined that a point where a menu is displayed is touched on a map screen, the controller 130 performs a control operation which corresponds to the menu.

A user is able to input a location and a direction by performing a user manipulation with respect to a map screen while the map screen is displayed. To be specific, the user is able to touch a point on the map screen, and drag or flick the touch point in a certain direction thereby inputting a location and a direction. When a random location and direction are determined by the user manipulation of the map screen while the map screen is displayed, the controller 130 displays an image which is seen in a predetermined direction at the location on the map screen additionally. Herein, an image may be an photographic image which was photographed in the direction and at the location selected by the user manipulation. The photographic image may be variably named as a view image, a street view image, a road view image, and the like.

In addition, when a route is inputted to the map screen by a user manipulation, the controller 130 may display a plurality of photographic images corresponding to a plurality of locations on the route and may display directions to the plurality of locations thereof. The plurality of photographic images may be displayed according to each location, and may be displayed on a point sequentially so as to be recognized as a moving image.

To be specific, the controller 130 may determine a destination according to a user manipulation detected by the detector 120 while a navigation function is executed. When a destination is determined, the controller 130 additionally displays a current location of the user terminal device 100 or a moving route from a departure point inputted by a user to the destination on the map screen. The departure point may be automatically determined as the current location of the user terminal device 100.

The controller 130 may additionally display an image which is seen in a direction of the moving route on the map screen. At a single point, a user is able to see an image at various points along a 360 degrees circumference. Thus, a plurality of images may be provided at a single point. The controller 130 may select an image which is located in a direction of the moving route from among the plurality of images, and may display the image on a side of the moving route. Hence, the user is able to easily follow the route and rightly follow the images representing real views which the user may see when moving along the moving route.

Figure 2:
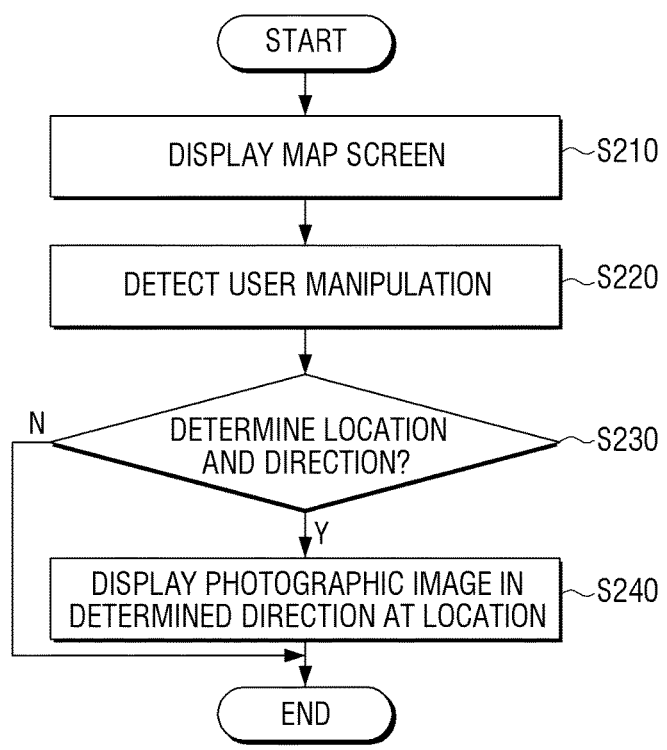
FIG. 2 is a flow chart for explaining a display method according to an exemplary embodiment.

FIG. 2 is a flow chart for explaining a method of displaying an image in a user terminal device according to an exemplary embodiment.

According to FIG. 2, the user terminal device 100 displays a map screen (S210). When a user manipulation is detected (S220), the user terminal device 100 determines a location and a direction on the map screen based on the user manipulation (S230). When the location and the direction are determined, the user terminal device 100 displays an image which is seen in the determined direction at an actual location on the map screen corresponding to the determined location (S240).

Herein, an image may be an photographic image which is photographed in the direction the user is moving. The user terminal device 100 may download the image from a server.

Figure 3:
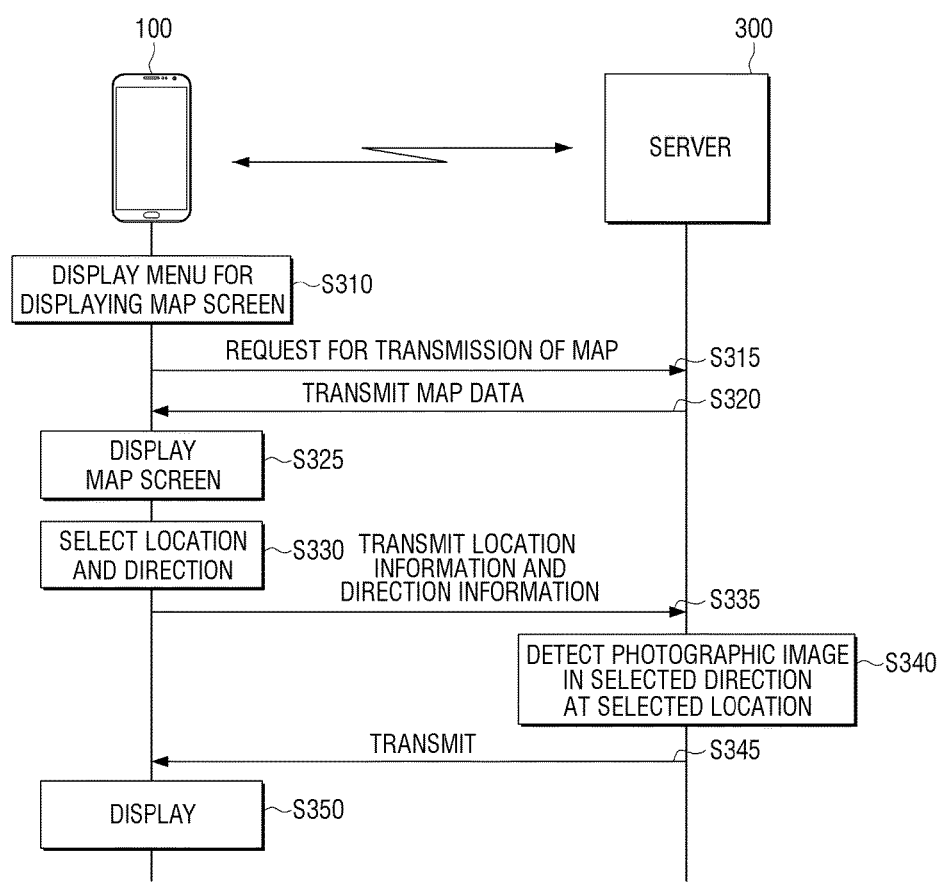
FIG. 3 is a view for explaining a process of receiving an image from a server according to an exemplary embodiment.

FIG. 3 is a view illustrating a network system including a server and operations thereof. In FIG. 3, a server 300 may be implemented as various types different servers including a web server, a cloud server, and the like. The server 300 may store photographic image at various locations in various directions according to an area.

The user terminal device 100 and the server 300 may communicate with each other by a variety of communication methods.

When a map screen display menu is selected (S310), the user terminal device 100 accesses to the server 300 and requests the transmission of a map (S315). In this case, the user terminal device 100 may transmit information of a current location along with the request. The server 300 transmits map data in response to the request (S320). When the information on the current location is received, the server 300 may transmit map data corresponding to an area within a certain radius of the current location. In addition, although FIG. 3 illustrates that the server 300 provides map data, the aforementioned operations of S315 and S320 may be omitted when the map data is stored in the user terminal device 100.

The user terminal device 100 displays a map screen by using the map data (S325). A user is able to select a location and a direction within the map screen. When the location and the direction are selected (S330), the user terminal device 100 transmits location information and direction information to the server 300 (S335). When the location information and the direction information are received, the server 300 detects an image corresponding to the location information and the direction information (S340). The server 300 transmits the detected image to the user terminal device 100 (S345).

The user terminal device 100 may display the received image along with the map screen (S350).

As above, the server 300 transmits an image which is requested by the user terminal device 100. In a case of a normal camera, a single image may not include views in a 360 degree direction. Accordingly, even though an image is photographed at a same location, different images are photographed according to a direction of the camera. The server 300 stores the images, and when the location information and the direction information are received from the user terminal device 100, the server 300 detects and transmits an image corresponding to the location information and the direction information to the user terminal device 100. In this case, it is not necessary to transmit all of the photographic images, and only some the images photographed in a particular direction will be transmitted. Thus, it becomes possible to decrease a network load and it is not necessary to check the images immediately.

Figure 5:
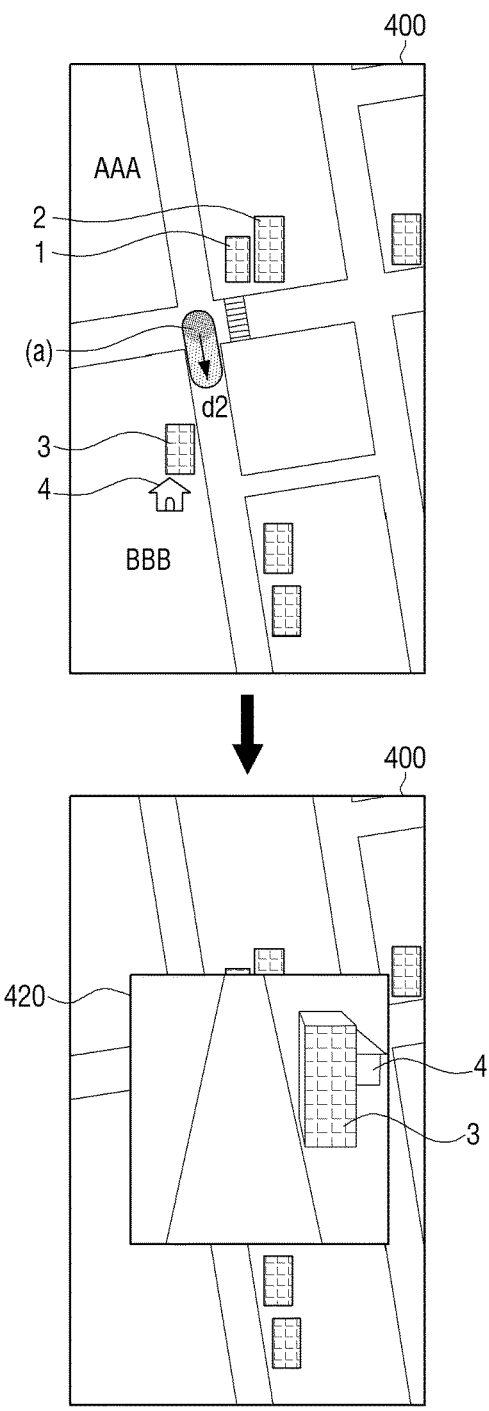

FIG. 4 and FIG. 5 illustrate an example of a user manipulation of determining a location and a direction on a map screen according to an exemplary embodiment. According to FIG. 4, when a user touches a random point (a), and drags or flicks the point in an arrow direction (d1) while a map screen 400 is displayed, the controller 130 determines that an initial touch point (a) is selected and detects location information for the point. The controller 130 also determines direction information based on the direction where the drag operation or the flick operation is executed. Hence, an image 410 of a building 1, 2, having been photographed and located in the direction of the arrow, is displayed on the map screen 400 by the controller 130.

FIG. 5 illustrates a state where the same point (a) of FIG. 4 is touched and dragged or flicked in a different direction (d2). In this case, the controller 130 displays an image 420 which is photographed in the different direction (d2) from the same point (a) of FIG. 4. Hence, a user is able to see the image 420 including the building 3, 4 which was not shown on the image 410 in FIG. 4.

Although FIG. 4 and FIG. 5 illustrate that the image 410 is displayed to be overlaid with the map screen 400 on a point (a) selected by a user within the map screen 400, a display location or a display method of the image 410 may be modified variously according to an exemplary embodiment. For example, the image 410 may be displayed on a separate screen from the map screen 400.

Meanwhile, the aforementioned method of displaying an image may be used in an indoor environment as well as an outdoor environment.

Figure 6:
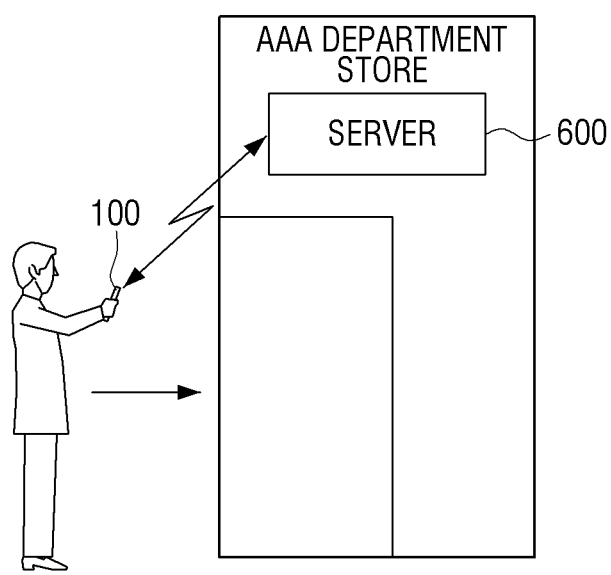
FIG. 6 is a view for explaining a method of providing a map screen of an indoor environment according to an exemplary embodiment.
Figure 7:
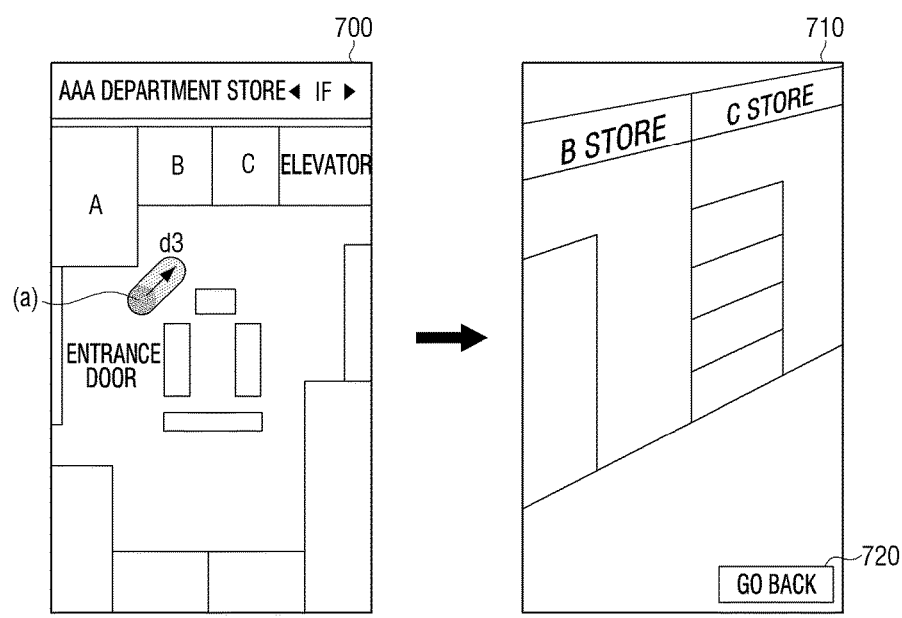
FIG. 7 is a view for explaining a method of displaying an image by using a map screen of an indoor environment according to an exemplary embodiment.

FIG. 6 and FIG. 7 are views for explaining an exemplary embodiment of providing an image in an indoor environment.

According to FIG. 6, when a user having the user terminal device 100 enters a periphery or inside of a particular building, a server 600 and the user terminal device 100 are connected and communicate. The communication may be performed by various methods such as Wi-Fi, Bluetooth, Zigbee, Near Field Communication (NFC), and the like.

The server 600 may be an individual server which is operated by an owner or a custodian of the building, or may be a portal server which is connected through internet. The server 600 may transmit various map information related to the building after automatically connecting and establishing communication with the user terminal device 100, when the user terminal device approaches within an effective communication range. Map information may include a floor plan of the building. The user terminal device 100 which receives the map information displays an inside map of the building based on the map information.

FIG. 7 illustrates a state where a map of the inside of the building is displayed, according to an exemplary embodiment. When a building is composed of a plurality of floors, a map may be provided according to a floor. A user is able to select a location by touching a random point within a map, and is able to select a direction by dragging or flicking the point in any direction.

FIG. 7 also illustrates a state where a direction (d3) is selected after the point (a) is touched, according to an exemplary embodiment. The controller 130 of the user terminal device 100 transmits location information and direction information corresponding to a user manipulation to the server 600. The server 600 selects an image corresponding to the location information and the direction information, and transmits the selected image to the user terminal device 100. The controller 130 displays the transmitted image 710 through the display 110. The displayed image 710 may be a photographic image which is photographed in a selected direction on a selected point by a user. A previous screen, that is, a menu 720 for returning to a map screen 700 may also be displayed within the image 710. When the menu 720 is selected, the controller 130 may stop displaying the image 710, and may display the previous map screen 700 again.

Meanwhile, although FIG. 7 illustrates a case where the image 710 is displayed on an entire screen according to an exemplary embodiment, the image 710 may also be displayed on part of an area of the map screen 700 as described in the aforementioned other exemplary embodiments.

In the above exemplary embodiments, a process of checking an image by using a map has been explained in detail, but the map and the image may be provided as directions. For example, when a user executes a navigation program and sets a destination, an image may be displayed selectively according to a moving route to the destination and a moving direction thereof.

Figure 8:
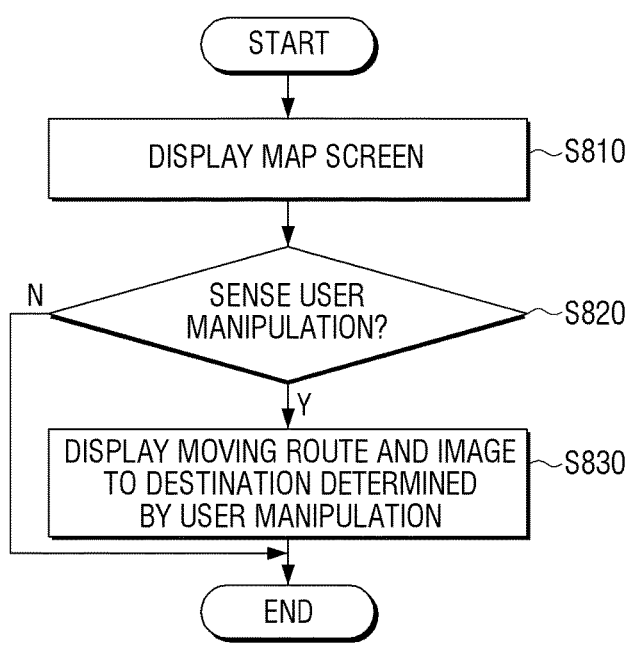
FIG. 8 is a flow chart for explaining a display method according to another exemplary embodiment.

FIG. 8 is a flow chart for explaining a navigation method in a user terminal device according to the exemplary embodiment. According to FIG. 8, the user terminal device 100 displays a map screen (S810). The controller 130 may display the map screen by executing a navigation program. In this state, when a user manipulation is detected (S820), and a destination or a moving route is selected according to the user manipulation, the controller 130 displays the selected moving route and at least one image corresponding to the selected moving route (S830), according to an exemplary embodiment. Herein, the image may be a photographic image which is photographed in a direction of a moving route, that is, a moving direction.

Figure 9:
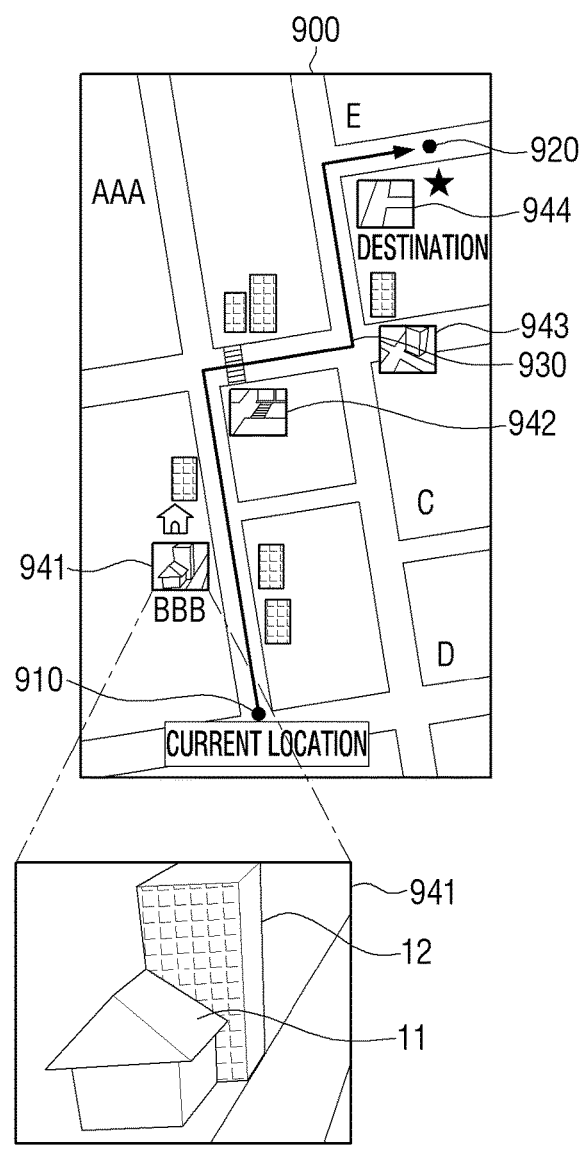
FIG. 9 and FIG. 10 are views for explaining an example of an image which varies according to a moving direction according to an exemplary embodiment.
Figure 10:
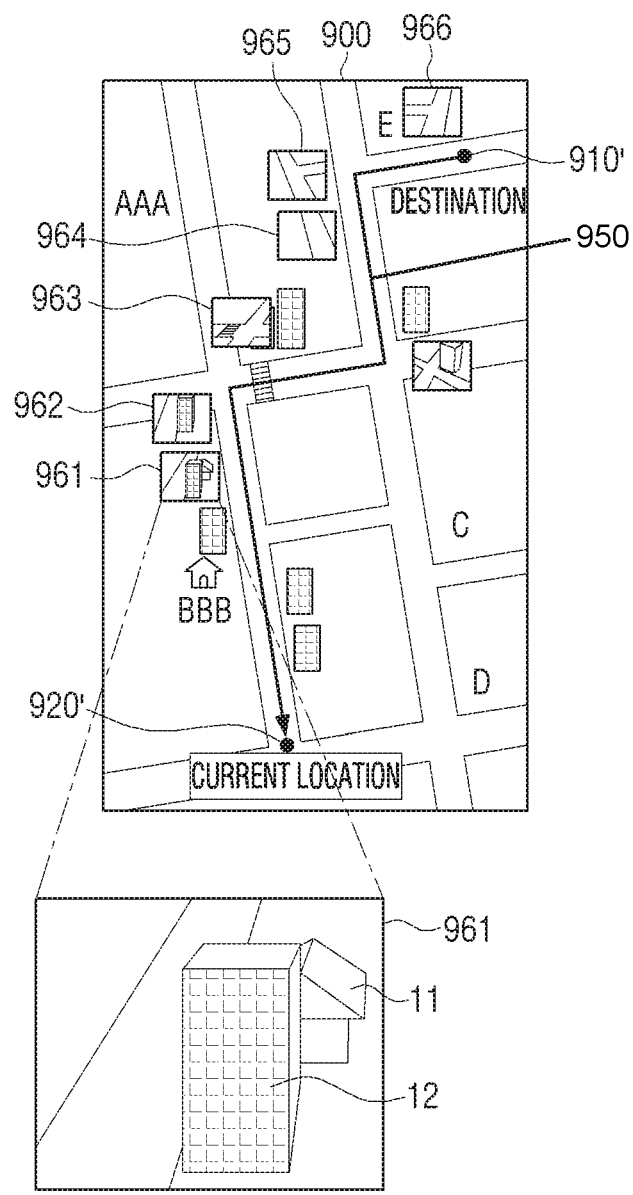

FIG. 9 and FIG. 10 are views for explaining a method of providing a different image according to a moving direction. According to FIG. 9, when a departure point 910 and a destination 920 are determined while a map screen 900 is displayed, the controller 130 displays a moving route 930 from the departure point 910 to the destination 920. The moving route 930 may be determined based on road information within the map screen 900.

For example, when a user sets a search condition for a moving route having a minimum distance, the controller 130 may set a shortest route from the departure point 910 to the destination 920 as the moving route 930. When the user sets the search condition for an optimal route, the controller 130 may set a route which takes a shortest amount of moving time as the moving route 930 by simulating the moving route 930 considering a distance between the departure point 910 and the destination 920, a moving speed, a traffic situation, and the like.

Besides, according to various conditions capable of being set by a user, it is possible to set a most economical route, a route which passes through a maximum number of tourist spots or famous attractions the most, and the like as the moving route 930, for example. In addition, when a plurality of routes exist between a destination and a departure point, it is possible to recommend the plurality of routes to a user according to the aforementioned conditions, and when one of the recommended routes is selected, to determine the selected route as moving route 930. When the moving route 930 is determined, the controller 130 further displays images 941 to 944 photographed in a moving direction on a point included in the moving route 930 on the map screen 900.

FIG. 9 illustrates a state where a plurality of images 941 to 944 are arranged sequentially along a moving route. In FIG. 9, the first image 941 which is displayed first from the departure point 910 represents a photo photographed when a plurality of buildings 11, 12 are arranged sequentially. Meanwhile, FIG. 10 illustrates a case where a moving direction is in an opposite direction of the moving direction in FIG. 9, according to an exemplary embodiment. That is, when the departure point 910 and the destination 920 of FIG. 9 are switched, the controller 130 displays a moving route 950 which corresponds to a new departure point 910' and a new destination 920'. In addition, the controller 130 displays new images 961 to 966 which correspond to the new moving route 950 and moving direction thereof.

In FIG. 10, the sixth image 961 which is displayed first from the destination 920 represents a photo which is photographed in a different direction on a point the same as the point of the first image 941. That is, the sixth image 961 in FIG. 10 shows that the arrangement order of each of the buildings 12, 11 is the reverse of the arrangement order of the first image 941 in FIG. 9. Thus, the controller 130 provides an image at a point of time which corresponds to an actual moving direction so that a user is able to check a right image corresponding to a moving direction. The user may rotate or enlarge an image by touching the image or performing a hovering manipulation on the image by using an input means such as a finger or a pen.

FIG. 9 and FIG. 10 illustrate a state where each image is arranged sequentially at regular intervals along a moving route. Herein, an interval between each of the images may vary according to a moving speed. That is, the present navigation method may be used when a user moves by walking as well as moves by a vehicle or other transportation means. When a user moves by walking, the moving speed is considerably decreased as compared with a case where the user moves by a vehicle. Thus, it is favorable to a user to display more images. Accordingly, when it is assumed that images photographed by an interval of every 100 meters are displayed sequentially along a moving route when a user moves by a vehicle, images photographed by an interval of every 10 or 20 meters may be displayed sequentially along the moving route considering a moving speed when the user moves by walking.

Figure 11:
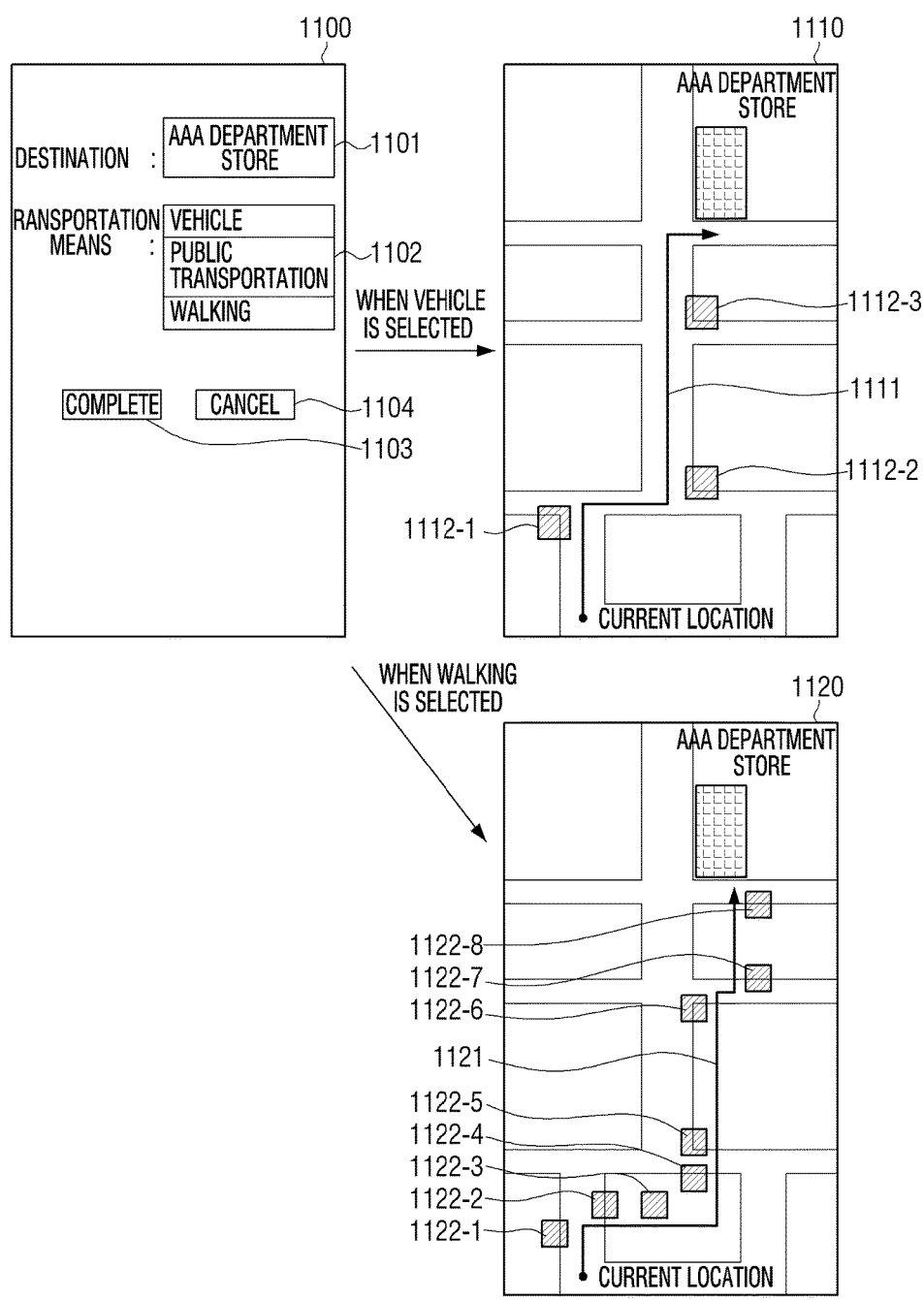
FIG. 11 is a view illustrating an example of a configuration of a navigation screen which varies according to a type of transportation means according to an exemplary embodiment.

FIG. 11 is a view for explaining a navigation method which varies according to transportation means. According to FIG. 11, a user is able to set a destination by using a setting screen 1100. In FIG. 11, the setting screen 1100 may display a destination input area 1101, a transportation means select area 1102, a setting complete button 1103, a cancel button 1104, and the like.

Although FIG. 11 illustrates that the setting screen 1100 sets a destination and a transportation means only for convenience in explanation, an actual setting screen 1100 may further display an area for setting other various options in addition to the aforementioned options. For example, the setting screen 1100 may further display areas such as a departure point input area, a stop input area, a route condition select area, and the like.

In addition, the setting screen 1100 may be implemented so as to use a part of an area within a map as a setting area and to allow a user to select a destination or transportation means within the setting area without a separate setting screen.

When a user selects a destination and transportation means, the controller 130 selects an optimal route or a shortest route where the user is able to move by using the selected transportation means from among routes from a current location of the user terminal device 100 to the destination. FIG. 11 illustrates a case where a vehicle is selected and a case where a walking is selected, according to an exemplary embodiment.

In FIG. 11, when a vehicle is selected, the controller 130 displays a map screen 1110 which shows a first route 1111 from the current location to the destination. In addition, the controller 130 sequentially displays a plurality of images 1112-1 to 1112-3 photographed in a moving direction of the first route 1111 within the map screen 1110.

When a walking is selected, the controller 130 displays a map screen 1120 including a second route 1121 where a user is able to move by walking. In addition, the controller 130 sequentially displays a plurality of images 1122-1 to 1122-8 photographed in a moving direction of the second route 1121.

According to FIG. 11, when a user moves by walking, a moving route is determined by a route through a passage where a vehicle may not enter. In addition, the images 1122-1 to 1122-8 which are displayed when the user moves by walking may be displayed at an interval narrower than an interval of the images 1112-1 to 1112-3 which are displayed when the user moves by a vehicle, by considering a moving speed.

As above, the method of providing an image or the navigation method of the present disclosure may be implemented in an indoor environment as well as an outdoor environment, and may be implemented when a user moves by walking as well as moves by a vehicle.

Meanwhile, the user terminal device 100 may be manipulated by an input means such as a pen, in addition to being manipulated by a touch of a part of a user's body such as a finger. A touch using a pen is more precise than a touch using a finger. Accordingly, even though an image is displayed in a small size within a map screen 330, it is possible to rotate a viewpoint of the image in up, down, left, and right directions by using a pen. A rotation angle may be limited to a certain range by depending on a moving direction. For example, the rotation angle may be limited to be in a range between 15 degrees and 30 degrees in up, down, left, and right directions, but not limited thereto, or may be implemented to rotate by 360 degrees according to an exemplary embodiment.

Figure 12:
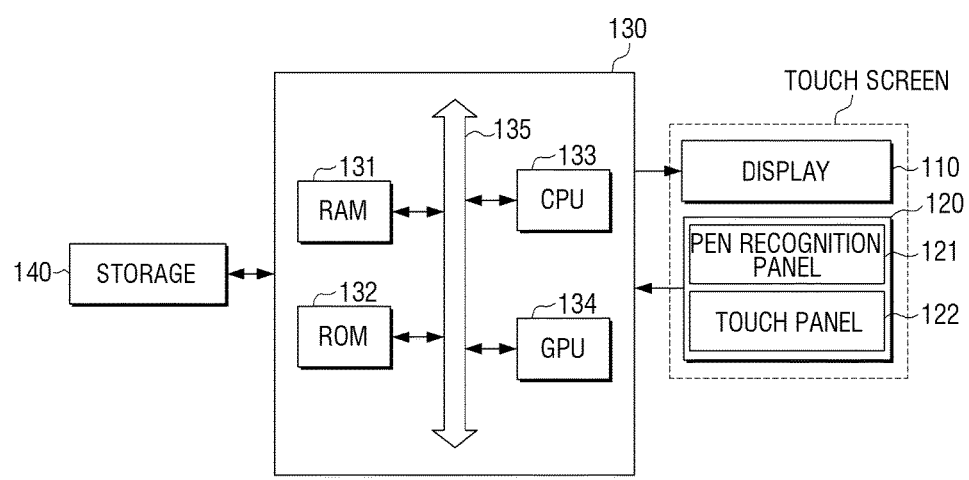
FIG. 12 a block diagram illustrating an example of a configuration of a user terminal device which is controllable by a pen according to an exemplary embodiment.

FIG. 12 is a block diagram which illustrates an example of a specific configuration of a user terminal device capable of distinguishing and recognizing a user touch manipulation from a pen manipulation. According to FIG. 12, the user terminal device 100 includes the display 110, the detector 120, the controller 130, and the storage 140. The storage 140 is a component for storing various programs and data necessary for operating the user terminal device 100. The controller 130 controls overall operations of the user terminal device by using the various programs and data stored in the storage 140. The controller 130 includes a Random- Access Memory (RAM) 131, a Read-Only Memory (ROM) 132, a Central Processing Unit (CPU) 133, a Graphic Processing Unit (GPU) 134, and a bus 135. The RAM 131, the ROM 132, the CPU 133, and the GPU 134 may be connected to each other through the bus 135.

The CPU 133 accesses the storage 140 and performs a booting by using an Operating System (O/S) stored in the storage 140. In addition, the CPU 133 performs various operations by using a variety of programs, contents, and data stored in the storage 140. The ROM 132 stores a command set for booting a system. When a turn-on command is inputted and power is supplied, the CPU 133 boots a system by copying the O/S stored in the storage 140 into the RAM 131, and operating the O/S. When a booting is completed, the CPU 133 copies various programs stored in the storage 140 into the RAM 131, and performs various operations by executing the programs copied into the RAM 131.

The GPU 134 displays various types of screens. When a navigation program is executed, the GPU 134 may display a map screen by using map data stored in the storage 140. To be specific, the GPU 134 may generate a map by using a calculator (not shown) and a rendering unit (not shown). A map screen may be expressed as a two-dimensional (2D) type or a three-dimensional (3D) type, and may include a graphic object for expressing various buildings, roads, and menus. The calculator calculates an attribute value, such as a coordinate value, where each object will be displayed, including a shape, a size, a color, and the like according to a layout of a screen. The rendering unit generates a map screen including each object based on the attribute value calculated by the calculator. The screen generated by the rendering unit is provided to the display 110, and is displayed within a display area.

The CPU 133 may determine which point is touched on a map screen according to a detected result which is outputted by the detector 120. Hence, when it is determined that a destination is inputted, the CPU 133 may search a moving route to the destination based on map screen data stored in the storage 140 or data stored in an external server. The GPU 134 may further display the searched moving route.

In addition, the CPU 133 may search an image which corresponds to a moving route and a moving direction from among photo images stored in the storage 140 or an external server. The GPU 134 may further display the searched image on a map screen. In this case, the image may be displayed by being overlaid with a graphic layer different from the map screen, and may be expressed as a single image by being combined with the map screen.

The display 110 displays various screens as described above. The display 110 may be implemented as various types of displays such as a Liquid Crystal Display (LCD), an Organic Light Emitting Diodes (OLED) display, a Plasma Display Panel (PDP), and the like. The display 110 may further include a driving circuit, a backlight unit, and the like, which may be implemented as an a-Si (amorphous Silicon) Thin Film Transistor (TFT), a Low Temperature Poly Silicon (LTPS) TFT, an Organic TFT (OTFT), and the like.

FIG. 12 illustrates a case where the display 110 and the detector 120 are implemented as a single touch screen, according to an exemplary embodiment.

When a user manipulation using various input means is detected, the detector 120 notifies the detected result to the controller 130. For example, a user touches a point on a screen by using a finger or a pen, the detector 120 notifies an x-coordinate value and a y-coordinate value of the touch point to the controller 130. When the user moves the touch point while maintaining the touch, the detector 120 notifies the changing touch coordinate value to the controller 130 in real time.

The detector 120 may detect a close approach even though there is no direct touch. To be specific, the detector 120 may include a pen recognition panel 121 and a touch panel 122. The pen recognition panel 121 detects an approach input or a touch input of a pen 200, and outputs an event signal according to the detected result. The pen recognition panel 121 may be implemented in an EMR method, and may detect a touch input or an approach input according to a strength variation of an electromagnetic field by an approach or a touch of a pen.

In further detail, the pen recognition panel 121 may include an electro induction coil detector (not shown) and an electronic signal processing circuit (not shown). The electro induction coil detector is formed in a grid structure where a plurality of loop coils are arranged to be crossed over each other. The electronic signal processing circuit provides each loop coil of the electro induction coil detector with an alternating signal sequentially, and transmits a signal which is outputted from each loop coil to the controller 130. When the pen 200 includes a resonant circuit and exists around a loop coil of the pen recognition panel 121, a magnetic field which is transmitted from the loop coil generates a current based on a mutual electro induction on the resonant circuit in the pen 200. Based on the current, an induction field is generated from a coil constituting the resonant circuit in the pen, and the pen recognition panel 121 detects the induction field from a loop coil in a signal receiving state. Thus, an approach location or a touch location of the pen is detected.

The foregoing has been described taking a pen as an example of an input means, but any object which may generate a current based on an electro induction may be used as an input means. The pen recognition panel 121 may be activated by default or according to an occurrence of a particular event by being disposed on a lower side of the display 110. The touch panel 122 is a component for sensing a physical touch input through a user's body or other objects.

For example, the touch panel 122 may be implemented as a touch film, a touch sheet, a touch pad, and the like. When a touch is detected, the touch panel 122 outputs a touch event value corresponding to the detected point. As described above, the touch panel 122 may include various types of touch detectors such as a capacitive type, a resistive type, and the like. As an example, when the touch panel 122 is implemented as a capacitive type, the touch panel 122 is coated with a dielectric which coats both sides of glass with a thin metal-conductive material (for example, Indium Tin Oxide (ITO) film, etc.) so that a current flows on a surface of the glass and an electric charge is stored. When a surface of the touch panel 122 is touched, a certain amount of electric charges move to a contact location by static electricity, and the touch panel 122 detects a touch location by recognizing a current variation according to the movement of electric charges, and traces a touch event.

Herein, the touch event which is generated on the touch panel 122 may be generated by a human finger in general, but may be also generated by other material which may change a capacitance, for example, a conductive material which may change a capacitance.

Although FIG. 12 illustrates that the pen recognition panel 121 and the touch panel 122 are different panels, both panels may be implemented as a single panel. Hence, the detector 120 may distinguish and recognize a touch manipulation and an approach manipulation by a user's finger from a touch manipulation and an approach manipulation by a pen.

The controller 130 may perform various control operations according to the detected result. The pen recognition panel 121 may recognize a manipulation using a pen by a pixel unit. Accordingly, even though the controller 130 reduces a size of a menu which is displayed on a screen in a pen use mode, a user is able to select the menu easily. In order to detect a precise manipulation using a pen, the pen recognition panel 121 may be manufactured to be larger than a display panel in the display 110. Hence, it is possible to detect a user manipulation by a pixel unit from a boundary side of the display panel.

Figure 13:
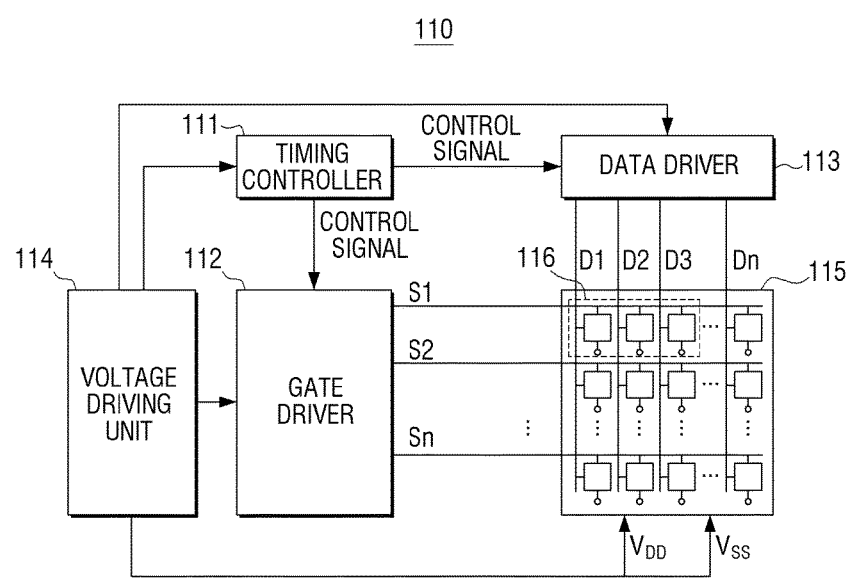
FIG. 13 is a view illustrating a specific configuration of a display of a user terminal device in FIG. 5, according to an exemplary embodiment.

FIG. 13 is a view for explaining an example of a specific configuration of the display 110. According to FIG. 13, the display 110 may further include other processing circuits such as a timing controller 111, a gate driver 112, a data driver 113, a voltage driving unit 114, and a display panel 115.

Although not illustrated in FIG. 13, the display 110 may further include a frame buffer and the like. The timing controller 111 receives a clock signal, a horizontal synchronizing signal (Hsync), and a vertical synchronizing signal (Vsync) from outside, which are appropriate for the display panel 115. The timing controller 111 generates a gate control signal (a scanning control signal) and a data control signal (a data signal), and outputs the signals to the gate driver 112 and the data driver 113, respectively.

The voltage driving unit 114 is a component for supplying a driving voltage to the gate driver 112, the data driver 113, the display panel 115, and the like. To be specific, the voltage driving unit 114 may provide a power supply voltage (VDD) or a grounding voltage (VSS) which is necessary for the display panel 115. In addition, the voltage driving unit 114 may generate a gate-on voltage (Vgh) and provide the gate driver 112 with the generated gate-on voltage (Vgh). The gate driver 112 is connected to the display panel 115 through scanning lines S1, S2, S3, . . . Sn.

The gate driver 112 applies the gate-on/off voltages (Vgh/Vgl) received from the voltage driving unit 114 to the display panel 115 according to the gate control signal generated by the timing controller 111. The data driver 113 is connected to the display panel 115 through data lines D1, D2, D3, . . . Dm. The data driver 113 inputs RGB data of an image frame to the display panel 115 according to a data control signal generated by the timing controller 111.

The display panel 115 is implemented such that a plurality of gate lines GL1 to GLn and a plurality of data lines DL1 to DLn form a pixel area 116 by being crossed over each other. When the display panel 115 is a panel consistent with an OLED method, each pixel area 116 may be implemented as a form including emitting elements of R, G, and B like an OLED. In each pixel area 116, a switching element, that is, a TFT is formed. In addition, in a lower side of each pixel area 116, detecting detectors for sensing a user manipulation by using a user's body or a pen may be disposed. That is, the detector 120 may detect a user manipulation by a pixel unit by being arranged with the display 110.

As specified above, a user is able to input a control command to the user terminal device 100 only by bringing an input means such as a finger or a pen close to a screen of the display 110 without touching the screen of the display 110. In this case, the detector 120 may sense an approach touch by using an approach detector, according to an exemplary embodiment. An approach touch refers to an operation which is recognized as a touch gesture when a movement is recognized within an effective recognition range in a space without a direct touch to a screen.

Figure 14:
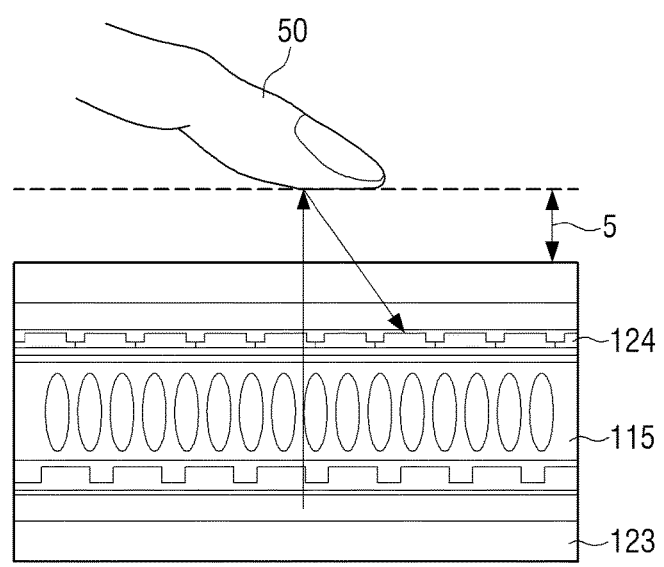
FIG. 14 is a view for explaining a method of sensing a hovering manipulation by using a user's body according to an exemplary embodiment.

FIG. 14 is a view for explaining a method of sensing an approach manipulation of a user's body by using an approach detector, according to an exemplary embodiment. Referring to FIG. 14, the detector 120 may further include an infrared source unit 123 and an infrared detector 124. The infrared source unit 123 and the infrared detector 124 may perform a function of an approach detector configured to sense a user's approach. To be specific, the infrared source unit 123 is disposed on a surface of the display panel 115 inside the display 110, and the infrared detector 124 is disposed on the other surface of the display panel 115. The infrared source unit 123 irradiates an infrared light in a direction of the surface of the display panel 115.

Hence, there exists a certain area which is capable of recognizing an approach of a user finger 50 over the surface of the display panel 115. The area is an effective recognition area 5 capable of recognizing an approach touch. The infrared detector 124 may include a plurality of infrared sensing elements which are disposed in a form of an array. Accordingly, when the user finger 50 approaches within the effective recognition area 5, the infrared detector 124 may sense an infrared light which is reflected by the user finger 50 and may generated an infrared scan image. The user terminal device 100 may sense an approach touch input by using the generated infrared scan image.

Figure 15:
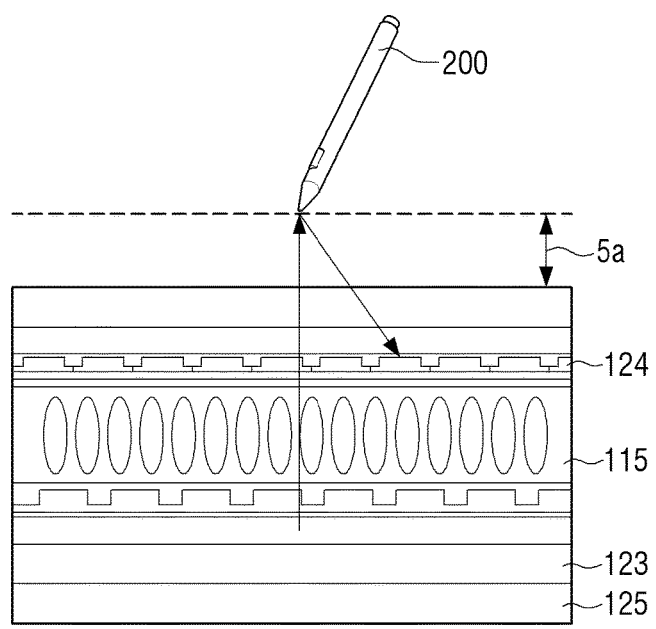
FIG. 15 is a view for explaining a method of sensing a hovering manipulation by using a pen according to an exemplary embodiment.

Meanwhile, the detector 120 may also sense an approach of the pen 200. That is, as specified above, the pen recognition panel 121 may include the electro induction coil detector and the electronic signal processing circuit (not shown). FIG. 15 illustrates an example of a configuration for sensing an approach of the pen 200 by using the pen recognition panel 121. According to FIG. 15, the display 110 may further include an electro induction coil detector 125. When the pen 200 approaches within a certain distance 5a, a magnetic field of the approached point is changed due to a magnetic field coil inside the pen 200, and thus, a changed magnetic field is sensed in the electro induction coil detector 125 on the point.

The sensed magnetic field is processed by the electronic signal processing circuit and inputted into the controller 130. The controller 130 may sense a point where the pen 200 approaches based on the inputted value. In addition, the controller 130 may also determine whether or not a direct touch is performed, according to an amount of variation of the magnetic field.

As illustrated in FIG. 14 and FIG. 15, by using the infrared source unit 123, the infrared detector 124, and the pen recognition panel 121, it is possible to recognize whether a user performs a touch input or an approach input by using a part of the human body like a hand 50, or by using the pen 200. The controller 130 may perform various control operations selectively according to a type and manipulation method of the input means.

In particular, when it becomes possible to perform a precise touch by using the pen 200 as described above, a user is able to designate a desired destination by touching each point accurately on a map screen with the pen 200. Alternatively, the user is able to designate a destination by writing a name or address of the destination on the map screen by using the pen 200. In addition, the user is also able to draw a moving route on the map screen by using the pen 200. In this case, the controller 130 may express a point which is touched or approached by the pen 200 or trace thereof on the map screen as graphic lines, according to an exemplary embodiment.

To be specific, when a user performs a drawing operation on a map screen by using a finger or a pen, the GPU 134 renders an object according to the manipulation. The GPU 134 may express the map screen and the object on a different graphic layer respectively. That is, the GPU 134 displays a layer of the object to be overlaid with an upper side of a layer of the map screen. The GPU 134 may distinguish a finger manipulation from a pen manipulation, and may display graphic lines having a different attribute.

For example, a human finger may express a bold graphic line since its edge is blunt as compared to an edge of a pen, and a pen may express a fine graphic line. Other attributes such as a color, a shape, a thickness, and the like may vary according to a type of input means. The controller 130 may recognize contents drawn by a user, and may determine a destination, a moving route, and other setting details according to the recognized contents. In addition, the controller 130 may perform a navigation operation according to the determined result. The operations of the controller 130 may be performed by execution of various software stored in the user terminal device 100.

Figure 16:
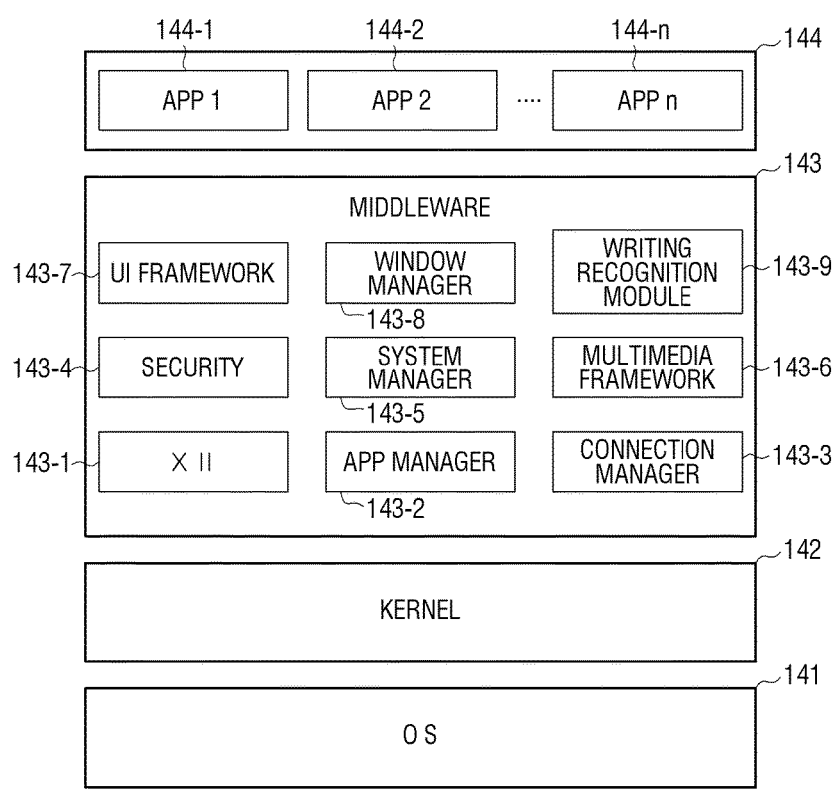
FIG. 16 is a view illustrating an example of a software structure which is used in a user terminal device according to an exemplary embodiment.

FIG. 16 is a view illustrating an example of a software configuration which is used by the user terminal device 100, according to an exemplary embodiment. The software illustrated in FIG. 16 may be stored in the storage 140, but not limited thereto, or may be stored in various types of storage means used within the user terminal device 100.

According to FIG. 16, the user terminal device 100 may store software including an OS 141, a kernel 142, a middleware 143, an application 144, and the like.

The operating system (OS) 141 performs a function of controlling and managing overall operations of hardware. That is, the OS 141 is a hierarchy configured to perform basic functions such as a hardware management, a memory, a security, and the like.

The kernel 142 performs a passage which is used in transmitting various signals sensed by the detector 120 to the middleware 143.

The middleware 143 includes a variety of software modules configured to control operations of the user terminal device 100. According to FIG. 16, the middleware 143 includes an X11 module 143-1, an APP manager 143-2, a connection manager 143-3, a security module 143-4, a system manager 143-5, a multimedia framework 143-6, a user interface (UI) framework 143-7, a window manager 143-8, and a writing recognition module 143-9.

The X11 module 143-1 is configured to receive various event signals from a variety of hardware disposed in the user terminal device 100. Herein, an event may be variously set as an event where a user manipulation is sensed, an event where a system alarm occurs, an event where a particular program is executed or closed, and the like.

The APP manager 143-2 is a module configured to manage an execution state of various applications installed in the storage 140. When an event where an application execute command is inputted from the X11 module 143-2 is sensed, the APP manager 143-2 calls and executes an application corresponding to the sensed event. That is, when an event where at least one object is selected on a home screen is sensed, the APP manager 143-2 performs an operation of calling and executing an application corresponding to the object.

The connection manager 143-3 is a module configured to support a wired network connection or a wireless network connection. The connection manager 143-3 may include various specific modules such as a DNET module, a Universal plug and play (UPnP) module, and the like.

The security module 143-4 is a module configured to support a certification of hardware, a permission of a request, a secure storage, and the like.

The system manager 143-5 monitors a state of each component in the user terminal device 100 and provides other modules with the monitored result. For example, when an energy of a battery remaining is not sufficient to power the user terminal device 100 or an error occurs, or a communication connection is disconnected, the system manager 143-5 may provide the UI framework 143-7 with the monitored result, thereby outputting a notification message or a notification sound.

The multimedia framework 143-6 is a module configured to play back multimedia contents which is stored in the user terminal device 100 or provided by an external source. The multimedia framework 143-6 may include a player module, a camcorder module, a sound processing module, and the like. Accordingly, the multimedia framework 143-6 may perform an operation of generating and playing back a screen and a sound by playing back various multimedia contents.

The UI framework 143-7 is a module configured to provide a variety of UIs. The UI framework 143-7 may include an image compositor module which configures various objects, a coordinate compositor which calculates a coordinate where an object is displayed, a rendering module which renders the configured object on the calculated coordinate, a 2D/3D UI toolkit which provides tools for configuring a UI in a form of 2D or 3D, and the like.

The window manager 143-8 may sense a touch event using a user's body or a pen or other input events. When such an event is sensed, the window manager 143-8 transmits an event signal to the UI framework 143-7 to perform an operation corresponding to the event.

The writing recognition module 143-9 is a module configured to parse a trace drawn by a user on a surface of the display 110, and to recognize the contents thereof. The writing recognition module 143-9 receives coordinate values of points which are touched through the pen recognition panel 121, and stores the coordinate values of the touch points as a stroke. In addition, the writing recognition module 143-9 may generate a stroke array by using the stroke. In addition, the writing recognition module 143-9 may recognize the written contents by comparing a pre-stored writing library with the generated stroke array. The recognized written contents are provided to the APP manager 143-2, and the APP manager 143-2 transmits the written contents to an application corresponding to an object on a point where the user writing is performed. When user writing is performed while a navigation program is operating and the written contents are texts, the writing recognition module 143-9 provides the APP manager 143-2 with a name or an address including the text. The APP manger 143-2 may provide the navigation program with the recognized name or address, and the navigation program may recognize a destination by using the provided name or address.

In addition, when the written contents are lines, the writing recognition module 143-9 may provide the navigation program with information on a point where the line is drawn through the APP manager 143-2. The navigation program may recognize a moving route by comparing a currently displayed map screen with a location of the line drawn by a user. Accordingly, as specified above, an application may perform a control operation based on the written contents.

Meanwhile, when a user performs a touch operation or a drawing operation with respect to a surface of the display 110 by using various input means such as a hand or a pen, the UI framework 143-7 may draw various graphic lines according to the user manipulation.

In addition, when an event where a pen is separated from or mounted on the user terminal device 100 occurs, the UI framework 143-7 performs an operation of changing a layout of a UI screen which is currently displayed. For example, when the pen 200 is separated from a main body of the user terminal device 100 while a map screen is displayed, the UI framework 143-7 may reduce a size of a menu area or enlarge a size of a map area within the map. That is, a user is able to perform a precise touch by using the pen 200, and thus, it is possible for the user to select each menu easily even though the size of the menu area is reduced. Accordingly, in a pen mode where a pen is separated from the main body of the user terminal device 100, the menu area may be reduced so that the user is able to use a broad map area.

The application module 144 includes applications 144-1 to 144-*n* for supporting various functions. For example, the application module 144 may include a program module for providing various services, such as a navigation program module, a game module, an e-book module, a calendar module, an alarm management module, and the like. Such applications may be installed by default, and may be arbitrarily installed and used by a user in a use process.

The software configuration illustrated in FIG. 16 is merely one exemplary embodiment, and thus, is not limited thereto. Accordingly, a part of the software configuration may be omitted or modified, or added according to the need. For example, the storage 140 may further include various programs such as a sensing module for analyzing signals sensed by each detector, a messenger program, a messaging module including a Short Message Service (SMS) & a Multimedia Message Program (MMS), and an e-mail program, a Call Info Aggregator program module, a VoIP module, a web browser module, and the like.

As described above, the user terminal device 100 may distinguish and recognize a touch manipulation and an approach manipulation using a user's body from a touch manipulation and an approach manipulation using a pen. The controller 130 may perform various control operations according to each manipulation. In particular, the controller 130 may provide the aforementioned image in various methods according to an exemplary embodiment. Hereinafter, various examples of control operations which may be performed in executing a navigation function will be described.

Figure 17:
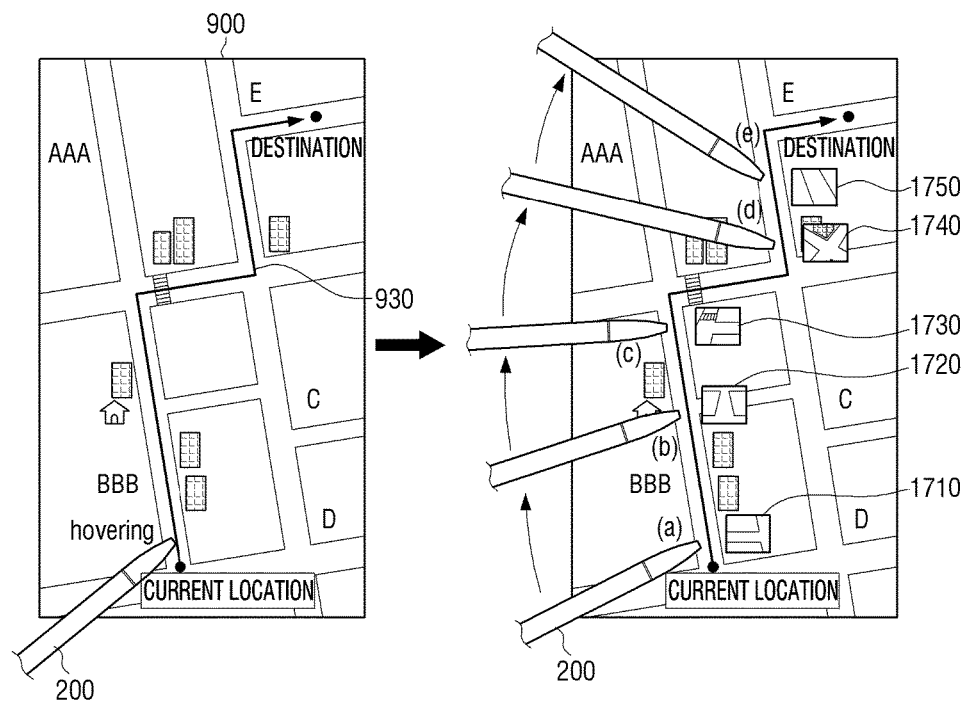
FIG. 17 is a view for explaining a method of providing a plurality of images according to a hovering manipulation according to an exemplary embodiment.

FIG. 17 is a view for explaining a navigation method according to another exemplary embodiment. According to FIG. 17, the controller 130 may display a moving route 930 within a map screen 900. When a user performs a hovering operation with respect to a certain point on the moving route 930 by using the pen 200 in this state, the controller 130 displays an image 1710 corresponding to a current moving direction from among images photographed at the point where the hovering operation is performed. When the user moves the hovering point along the moving route 930 in the direction of (a) to (e), the controller 130 sequentially displays images 1710 to 1750 of each point according to the hovering state. Hence, the user is able to see actual road views as though the user is actually moving along the moving route 930. The method of determining a hovering point has been explained in detail in FIG. 14 and FIG. 15 and the overlapped description will be omitted.

Figure 18:
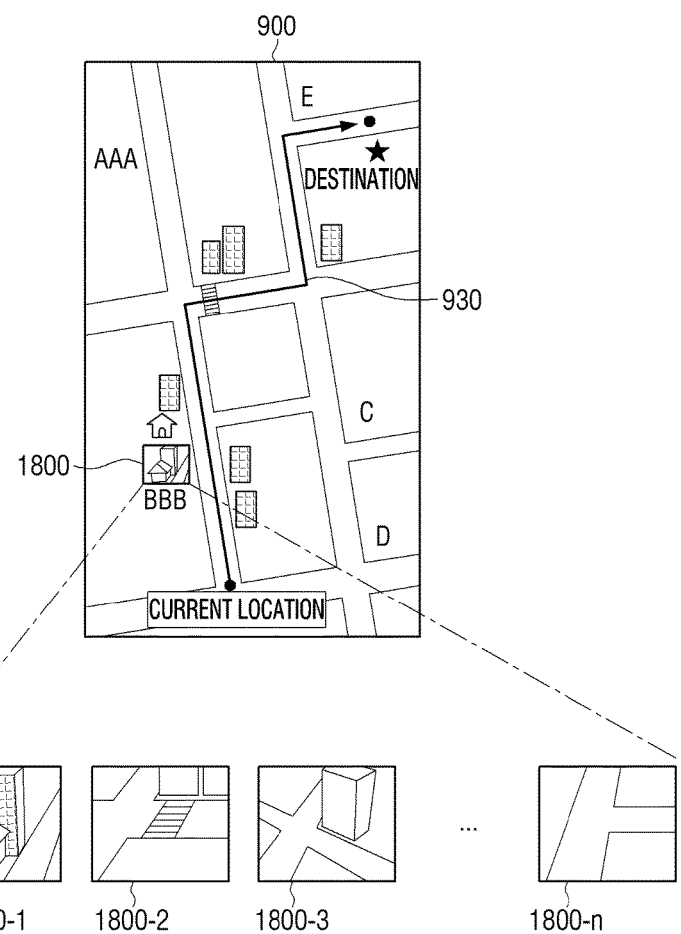
FIG. 18 and FIG. 19 are views for explaining a method of displaying a plurality of images like a moving image according to an exemplary embodiment.

FIG. 18 illustrates that a moving image display point 1800 is around a current location, which is merely one of the exemplary embodiments, and the display point may be variably changed. In addition, although FIG. 18 illustrates that the moving image display point 1800 is arranged within the map screen 900, the controller 130 may divide an entire screen and provide a screen to display a moving image separately from the map screen 900.

Figure 19:
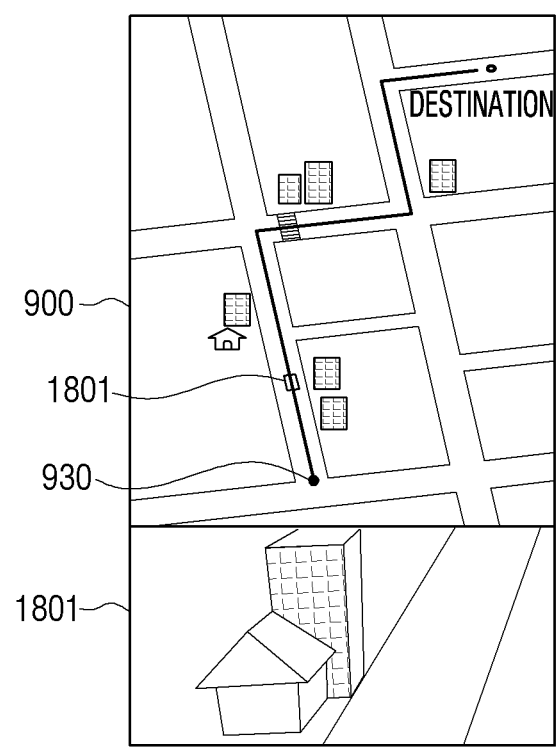

FIG. 19 illustrates an operation of a user terminal device according to the exemplary embodiment.

According to FIG. 19, the controller 130 displays a moving image display screen 1800 on a side of the map screen 900. The controller 130 may provide an effect as though a user is watching a moving image by sequentially displaying a plurality of images photographed along the moving route on the moving image display screen 1800. In addition, the controller 130 may display an icon 1801 which shows a location movement state on the moving route 930 of the map screen 900 along with the images.

When a movement simulation is performed in response to a user selection, the controller 130 may move the icon 1801 along the moving route 930, and may display an image corresponding to a point where the icon 1801 is displayed on the moving image display screen 1800 by synchronizing the image display with the icon movement. Hence, the user is able to see main images of each of the points on the moving route in a lump sum.

Meanwhile, although FIG. 18 and FIG. 19 combine the images of each point on the entire moving route 930 and illustrate the images as a moving image, actual moving contents may be provided as an image. In addition, when a user determines a point or a section necessary for generating a moving image on a moving route, the controller 130 may make an image corresponding to the selected point or section into a moving image.

Besides, images may be provided according to various methods. For example, the controller 130 may select points which meet a predetermined condition from a moving route, and may display an image corresponding to each of the selected points. To be specific, the controller 130 may divide the moving route into sections of a certain interval (for example, 50 m, 100 m, 500 m, 1,000 m, etc.), and may display an image on an boundary point of each section.

Alternatively, the controller 130 may select a location where an image is displayed and the image according to at least one of various conditions such as a crossroad point, an accident black point, a point of high frequency of a course deviation or a resetting, a vicinity of place where a user visited before, a vicinity of place of high frequency of a user setting, a vicinity of place having many user recommendations, a tourist spot, a point having many registered images, a place related to a destination set by a user, and the like.

As above, when a departure point and a destination are determined, the user terminal device 100 may detect a moving route corresponding to the determined departure point and destination, and may selectively display images of a location and a direction corresponding to the moving route. Herein, a departure point, a destination, and a moving route may be selected according to various methods according to an exemplary embodiment.

For example, a user is easily able to input a destination or a moving route on a map screen by using a pen.

Figure 20:
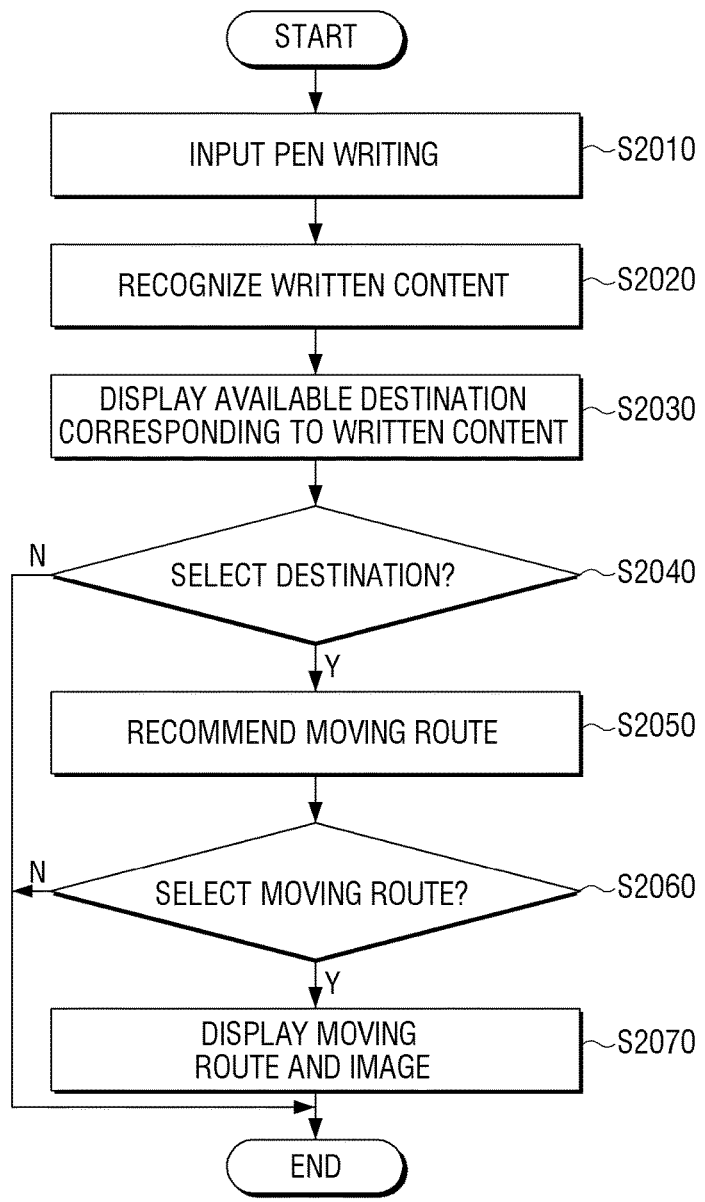
FIG. 20 is a flow chart for explaining a method of inputting a destination by using a pen according to an exemplary embodiment.

FIG. 20 is a flow chart for explaining an example of a method of inputting a destination in a user terminal device according to another exemplary embodiment. According to FIG. 20, when a user inputs a pen writing (S2010), the controller 130 recognizes the written contents (S2020). The method of recognizing the written contents has been explained in detail above and the overlapped description will be omitted.

When the written contents are recognized, the controller 130 displays at least one available destination corresponding to the written contents (S2030). When there is only one available destination, the controller 130 may omit a process of displaying an available destination.

A user is able to select one of the displayed available destinations (S2040). When the user select a certain destination, the controller 130 may check moving routes based on the destination and a current location, and may recommend one of the moving routes to the user (S2050). The user may select a moving route by inputting a confirm command or a re-search command with respect to the moving route (S2060).

When the user selects a moving route, the controller 130 may display the moving route and an image corresponding to the moving route (S2070).

Figure 21:
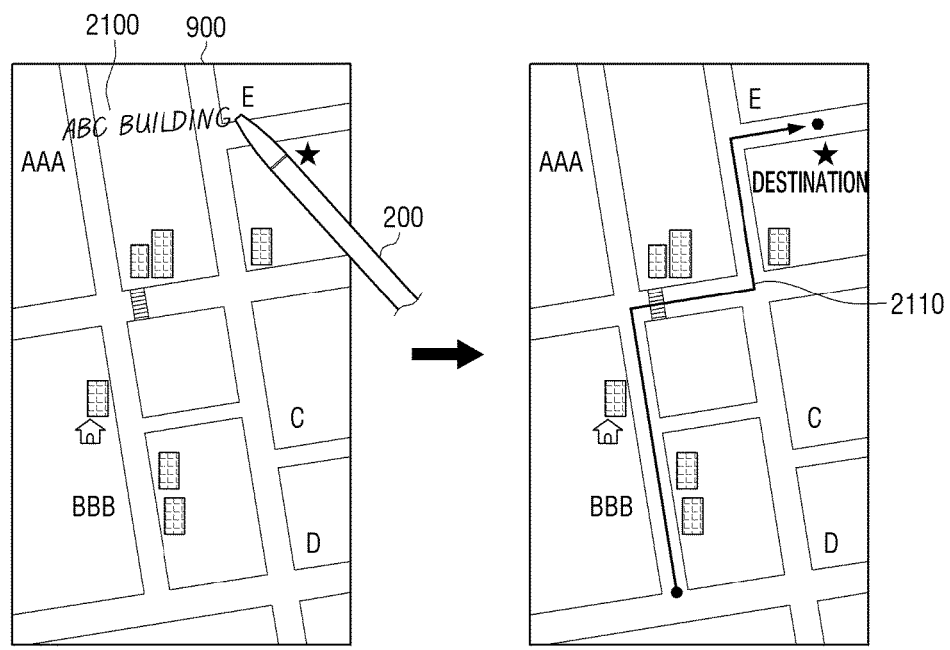
FIG. 21 is a view for explaining a process of setting a moving route according to the method of FIG. 20, according to an exemplary embodiment.

FIG. 21 is a view for explaining a method of inputting a destination according to the method of FIG. 20. As illustrated in FIG. 21, when a user writes a text 2100 (for example, ABC building) on the map screen 900 by using the pen 200, the controller 130 recognizes the written contents 2100 by using the writing recognition module.

In addition, the controller 130 searches destination information including the recognized written contents 2100 from a database stored in the storage 140 or an external server. When a destination is determined based on the search result, the controller 130 displays a moving route 2110 to the destination on the map screen 900 immediately.

Meanwhile, when there is a plurality of destination information including the recognized written contents 2100, the controller 130 may display a selection UI for selecting the plurality of destination information. Hence, when destination information is selected from the selection UI, the controller 130 may detect the moving route 2110 according to the selected destination information and may display the moving route on the map screen 900.

Figure 22:
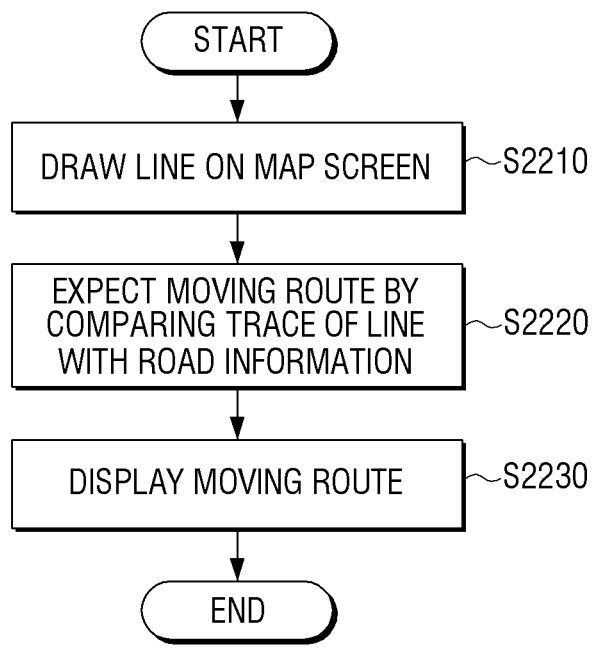
FIG. 22 is a flow chart for explaining a method of selecting a moving route by using a pen according to an exemplary embodiment.

FIG. 22 is a flow chart for explaining a method that a user inputs a moving route on a map screen according to an exemplary embodiment. According to FIG. 22, a user is able to draw a line on a map screen by using an input means such as the pen 200 (S2210). When the line is drawn, the controller 130 may expect a moving route by comparing a trace of the line with road information on the map screen (S2220).

In this case, a starting point where the line was initially drawn may be set as a departure point, and a point where a pen touch of the line is finished may be set as a destination. In addition, when the line trace drawn by the user is consistent with an actual road, the controller 130 may set the road as a moving route. By contrast, as for a line which is drawn not to be consistent with the actual road, the controller 130 may set a road which is most close to the line as a moving route, or may set a route of a section which is most similar to the line as a moving route among available routes between the departure point and the destination.

When a moving route is determined, the controller 130 displays the moving route on the map screen (S2230). In this case, the controller 130 may display an image corresponding to a moving direction along with the moving route.

Figure 23:
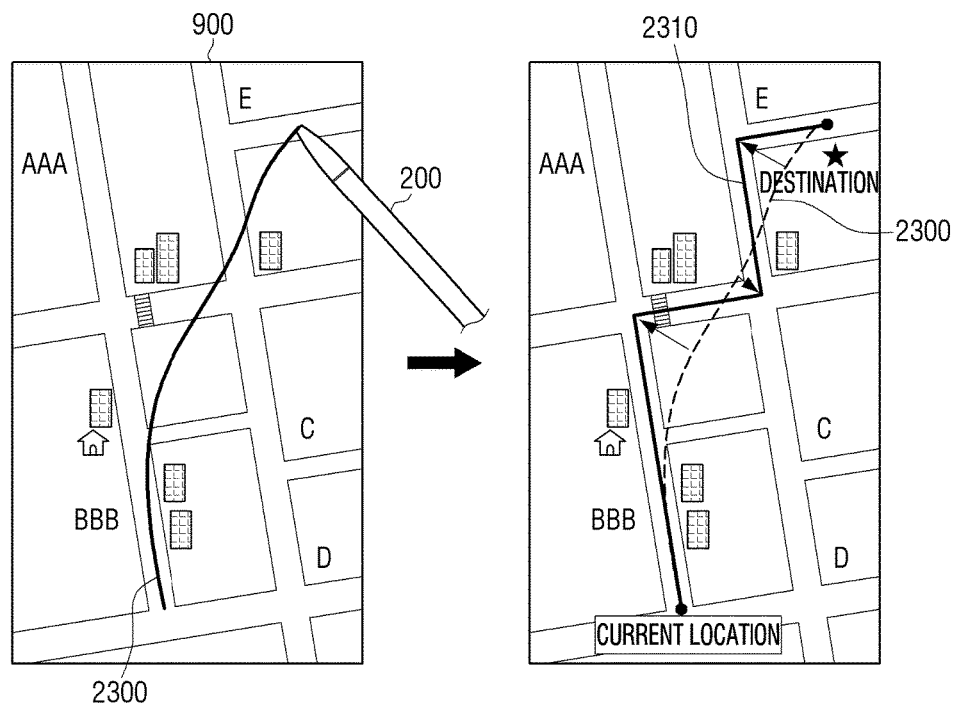
FIG. 23 is a view for explaining a process of setting a moving route according to the method of FIG. 22, according to an exemplary embodiment.

FIG. 23 is a view for explaining the method of selecting a moving route in FIG. 22. According to FIG. 23, when a user draws a random line 2300 on the map screen 900 by using the pen 200, the controller 130 may correct the line 2300 to correspond to an actual road, and may select the line 2300 as a moving route 2310.

To be specific, the controller 130 determines a starting point of the line 2300 drawn by the user on the map screen 900 as a departure point, and determines a last point of the line 2300 as a destination. In addition, the controller 130 selects a route which is most close to the line 2300 drawn by the user as a moving route from among the routes from the departure point to the destination.

In this case, the controller 130 may divide each route into a plurality of sections of a certain interval, select a route which is most similar to the line 2300 according to each section, connect all of the routes of each section, and select a final moving route. Hence, the user is able to select a destination or a moving route conveniently by using various input means.

Meanwhile, as described above, a user terminal device may be implemented as various types of devices such as a mobile phone, a tablet PC, a laptop PC, a PDA, a MP3 Player, an electronic picture frame device, a TV, a PC, a kiosk, and the like. Herein, when a user terminal device is implemented as a device like a mobile phone and a tablet PC having various functions such as a communication function, a content playing function, and the like, the user terminal device may further include components for performing such functions.

Figure 24:
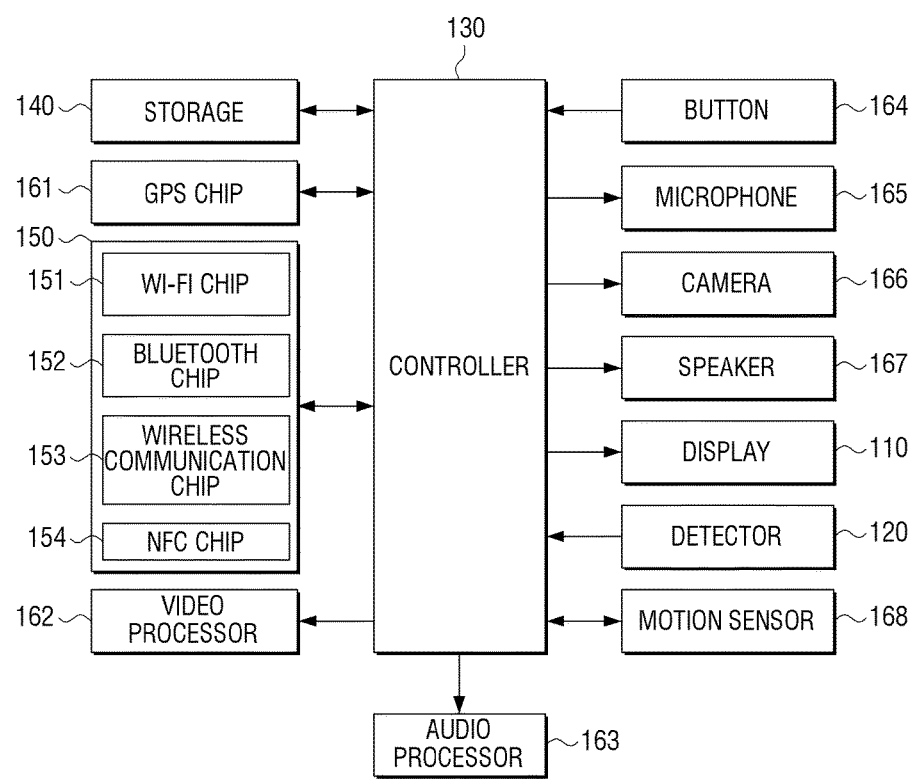
FIG. 24 is a block diagram illustrating a configuration of a user terminal device according to various exemplary embodiments.

FIG. 24 is a block diagram which illustrates an example of a user terminal device including various components, according to an exemplary embodiment.

According to FIG. 24, the user terminal device 100 may include the display 110, the detector 120, the controller 130, the storage 140, a communication unit 150, a Global Positioning System (GPS) chip 161, a video processor 162, an audio processor 163, a button 164, a microphone 165, a camera 166, a speaker 167, and a motion detector 168.

As described above, the display 110 and the detector 120 may be implemented as a touch screen, display various screens, and sense a user manipulation which is performed with respect to the screens.

The controller 130 controls overall operations of the user terminal device 100 by using various programs and data stored in the storage 140. In particular, the controller 130 may execute a navigation program, and provide the navigation method explained in the aforementioned various exemplary embodiments.

The display 110, the detector 120, and the controller 130 have been explained in detail above and the overlapped description will be omitted.

The communication unit 150 is a component which communicates with various types of external device according to various types of communication method. The communication chip 150 includes a Wi-Fi chip 151, a Bluetooth chip 152, a wireless communication chip 153, and a NFC chip 154.

The Wi-Fi chip 151 and the Bluetooth chip 152 perform communication by a Wi-Fi method and a Bluetooth method, respectively. When the Wi-Fi chip 151 or the Bluetooth chip 152 is used, a variety of communication information such as Sub System Identification (SSID) and a session key are exchanged first, and then a variety of information may be transmitted and received after communication is connected by using the communication information. The wireless communication chip 153 refers to a chip which performs communication according to various communication standards such as IEEE, Zigbee, 3rd Generation (3G), 3rd Generation Partnership Project (3GPP), Long Term Evolution (LTE), and the like. The NFC chip 154 refers to a chip which operates by a NFC method using a 13.56 MHz band among various Radio Frequency Identification (RF-ID) frequency bands such as 135 kHz, 13.56 MHz, 433 MHz, 860-960 MHz, 2.45 GHz, and the like.

The controller 130 performs communication with various external devices by using the communication unit 150. When the user terminal device 100 does not include map data or a navigation database, the controller 130 may receive map data or other location information from an external server by using the communication unit 150. In addition, when an image is not stored in the storage 140, the controller 130 may download an image from a server.

The communication unit 150 may directly communicate with an external user terminal device which is not a server, and may share a moving route or various images selected by a user. To be specific, a share menu may be displayed on a map screen. A user is able to input a share command by selecting the share menu. When the user inputs the share command, the moving route or the images displayed on the map may be transmitted to and shared with other user terminal device through the communication unit 150.

The GPS chip 161 is a component for calculating a current location of the user terminal device 100 by receiving a GPS signal from a GPS satellite. When a navigation function is selected, the controller 130 may determine the current location of the user terminal device 100 by using the GPS chip 161, and may set the current location as a departure point automatically.

The video processor 162 is a component for processing contents received through the communication unit 150 or video data included in contents stored in the storage 140. The video processor 162 may perform various image processing operations such as a decoding, a scaling, a noise filtering, a frame rate converting, and a resolution converting of video data. When an image is a photo or moving image content, the video processor 162 may perform the aforementioned image processing to the content, and may convert the content into a form which may be further displayed on a map screen.

The audio processor 163 is a component for processing the contents received through the communication unit 150 or audio data included in the contents stored in the storage 140. The audio processor 163 may perform various processing operations such as a decoding, an amplifying, and a noise filtering of audio data. The audio processor 163 may generate various voice guide messages or notification sounds which are required while a navigation function is executed.

When a multimedia contents play program is executed, the controller 130 may play the contents by executing the video processor 162 and the audio processor 163. The display 110 may display an image frame generated by the video processor 162.

In addition, the speaker 167 outputs audio data generated by the audio processor 163. Specifically, the speaker 167 may output various voice guide messages or a notification sounds while a navigation function is executed.

The button 164 may be various types of buttons including a physical button, a touch pad, and a wheel which are mounted on a random area such as a front part, a side part, and a rear part of an outer surface of a main body of the user terminal device 100.

The microphone 165 is a component for receiving and converting a user voice or other sounds into audio data. The controller 130 may use a user voice which is inputted through the microphone 165 while calling, or may convert the user voice into audio data, and store the converted audio data in the storage 140.

The camera 166 is a component for photographing a still image or a moving image according to a user control. The camera 166 may be implemented as a plurality of cameras including a front camera and a rear camera.

When the user terminal device 100 includes the camera 166 and the microphone 165, the controller 130 may perform a control operation according to a user voice inputted through the microphone 165 or a user motion recognized by the camera 166. That is, the user terminal device 100 may operate in a motion control mode or a voice control mode. When the user terminal device 100 operates in the motion control mode, the controller 130 photographs a user by activating the camera 166, traces a change of motion of the user, and performs a control operation corresponding to the motion. When the user terminal device 100 operates in the voice control mode, the controller 130 may analyze a user voice inputted through the microphone 165, and may operate in a voice recognition mode of performing a control operation according to the analyzed user voice.

In the user terminal device 100 which supports the motion control mode or the voice control mode, a voice recognition technology or a motion recognition technology may be applied in the aforementioned various exemplary embodiments.

For example, when a user performs a motion gesture which is set to trigger a control operation such as an operation for executing a navigation function or an operation for selecting a destination, the controller 130 may perform a control operation which is matched with the motion gesture. In addition, when the user pronounces a name of a destination, the controller 130 may recognize the name of the destination by analyzing the pronunciation, and may search a moving route for the recognized destination immediately.

The motion detector 168 is a component for sensing a motion of a main body of the user terminal device 100. That is, the user terminal device 100 may rotate or tilt in various directions. The motion detector 168 may sense a motion characteristic such as a rotation direction, a rotation angle, a gradient, and the like by using at least one of various detectors including a geomagnetic detector, a gyro detector, an accelerometer, and the like.

Besides, although it is not illustrated in FIG. 24, according to an exemplary embodiment, the user terminal device 100 may further include a Universal Serial Bus (USB) port to which a USB connector may be connected, various external input ports for connecting to various external terminals such as a headset, a mouse, and a Local Area Network (LAN), a Digital Multimedia Broadcasting (DMB) chip which receives and processes a DMB signal, and the like.

As specified above, the user terminal device 100 includes the communication unit 150, a user may share photos stored in his/her user terminal device, photos stored in other user terminal devices, and photos stored in a web server or a cloud server with other users. In this case, a number of images which are usable in executing a navigation function may be increased greatly, and thus, more various images may be displayed. In addition, various information other than images, such as information on a destination which a user searches frequently, or information on a route having good road conditions, may be shared with other users.

Hereinafter, exemplary embodiments of providing more various services through communication with other devices will be explained in detail.

Figure 25:
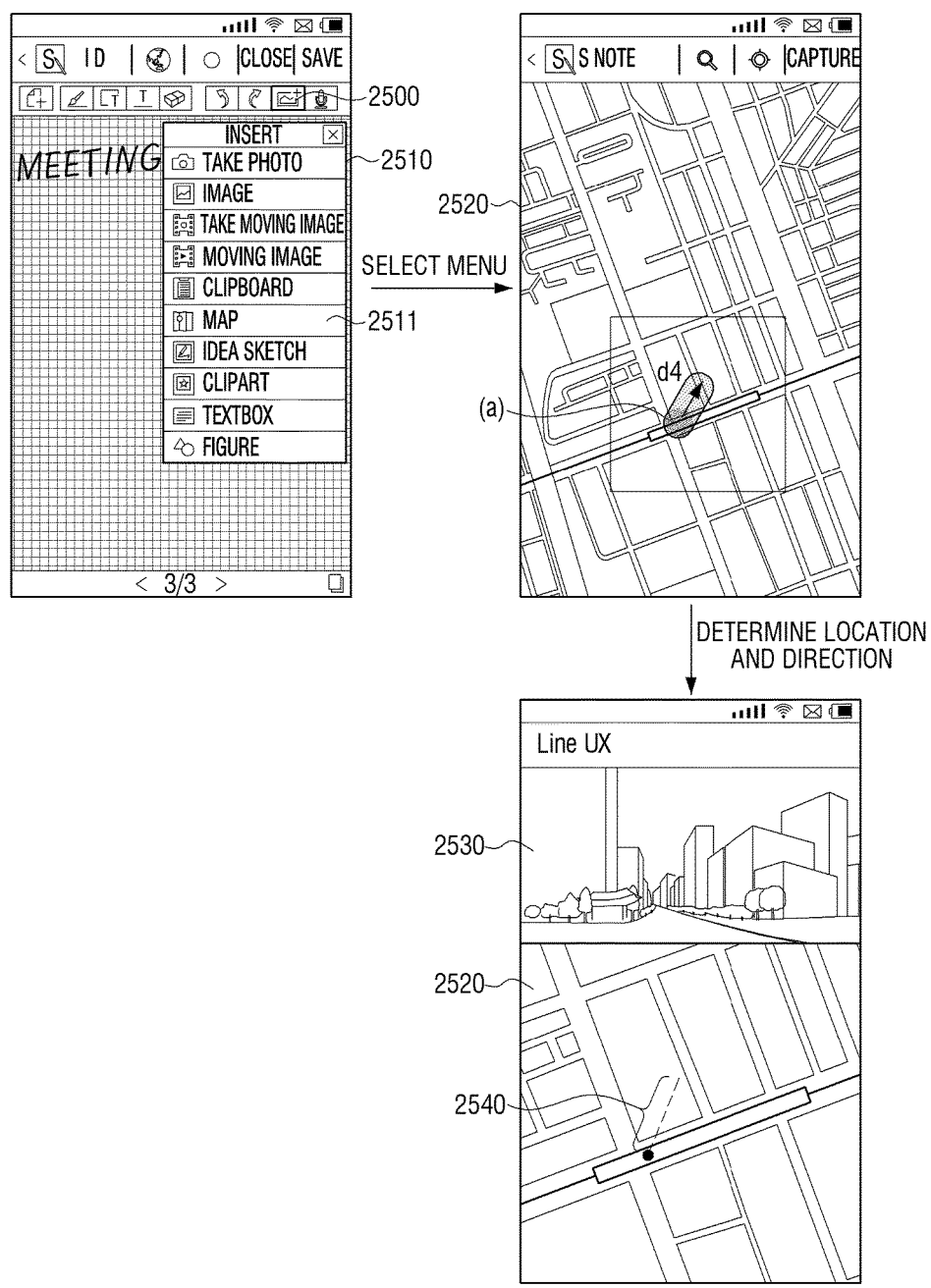
FIG. 25, FIG. 26, FIG. 27, and FIG. 28 are views for explaining various methods for generating a map screen to which an image is attached and sharing the map screen with other people according to an exemplary embodiment.

FIG. 25 is a view for explaining a display method of a user terminal device according to another exemplary embodiment. According to FIG. 25, a user is able to transmit a mail, a messenger, and a text message by attaching a map and a photo thereto.

To be specific, when a user executes a messenger or a mail program, the controller 130 displays an execution screen 2500. When the user selects a particular menu from the execution screen 2500, the controller 130 displays a list 2510 of sub menus which belong to the selected menu. The list 2510 may include a menu 2511 to which a map may be attached.

When the user selects the menu 2511, the controller 130 displays a map screen 2520. The map screen 2520 may be displayed based on a current location of the user terminal device 100, but not limited thereto. For example, the map screen 2520 may be displayed based on a location which is selected by the user.

When the map screen 2520 is displayed, the user is able to select a random location and direction within the map screen 2520. FIG. 25 illustrates a state where a point (a) is touched and dragged or flicked in a direction (d4), according to an exemplary embodiment. When a location and direction are determined according to the user manipulation, the controller 130 adds an image 2530 photographed at the location in the direction on the map screen 2520 or on a side of the map 2520, and generates a corrected map.

The corrected map may display a graphic image 2540 which represents a location and direction corresponding to the currently displayed image 2530. In addition, although it is not illustrated, the corrected map may display various menus (not shown) for attaching, editing, and storing, or cancelling generation of the accompanying image. When the user selects an attach menu (not shown), the controller 130 attaches the corrected map to a mail, a messenger, a text message, and the like. Hence, the user is able to share the map and the image with other users. When the user selects a store menu, the controller 130 stores the corrected map in the storage. Hence, the corrected map which is stored in the storage may be used anytime, if necessary.

Meanwhile, the user may add a desired picture or handwriting on the map screen 2520 or the image 2530.

Figure 26:
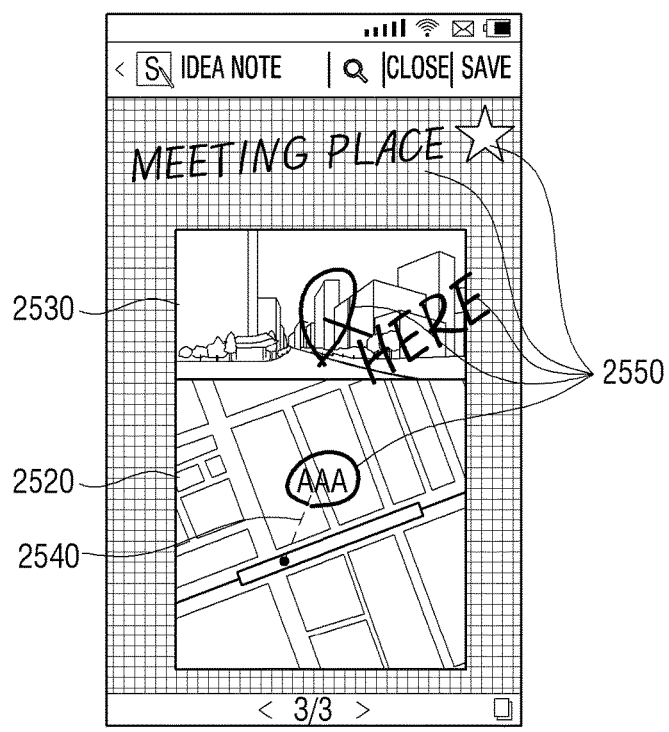

FIG. 26 illustrates a state where the user adds various pictures and handwritings on the map screen 2520 or the image 2530. The user is able to draw various objects 2550 such as a picture and handwriting on the map screen 2520 or the image 2530 by using an input means such as a finger or a pen. Hence, a map screen which also includes the objects 2550 drawn by the user may be generated.

Figure 27:
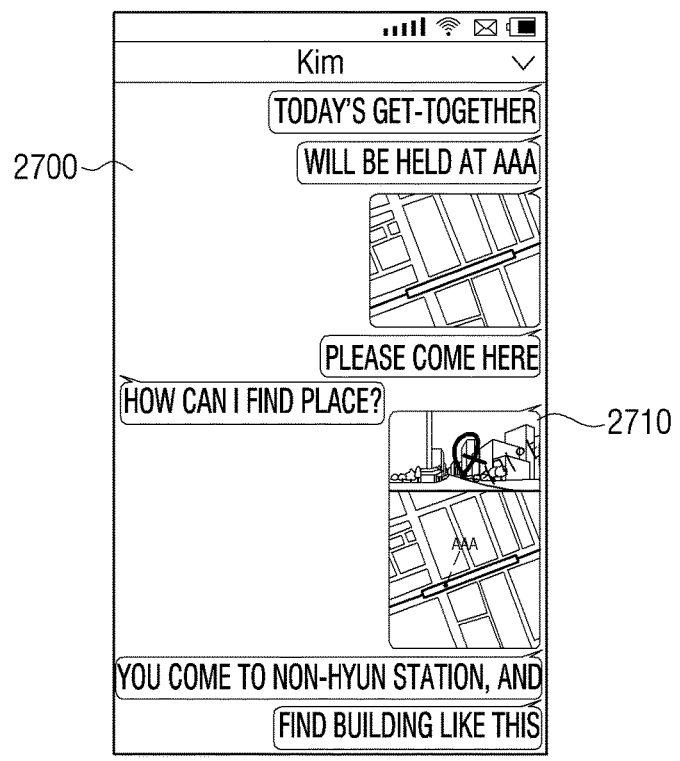

FIG. 27 illustrates a method of sharing the map with other people. FIG. 27 illustrates an example of a screen of transmitting and receiving a messenger. As illustrated in FIG. 27, the controller 130 may generate and transmit a map 2710 to which an image is attached while exchanging a messenger with other people, in the method explained in FIG. 25. In this case, the controller 130 may transmit the map or image by adding an appropriate picture or handwriting thereto as explained in FIG. 26. In addition, when there is a map which was previously generated and stored, the controller 130 may select and transmit the map immediately.

Accordingly, it becomes possible to provide another party with a view on an actual road as well as a location on a map so that the other party is able to use the map or the image more easily.

In addition, the user terminal device 100 may share data with other device in various methods. As an example, the user terminal device 100 may directly share data with other device by using a Bluetooth method or a NFC method, without passing through a server. Hence, users are able to share a map to which an image is added with other party directly.

Figure 28:
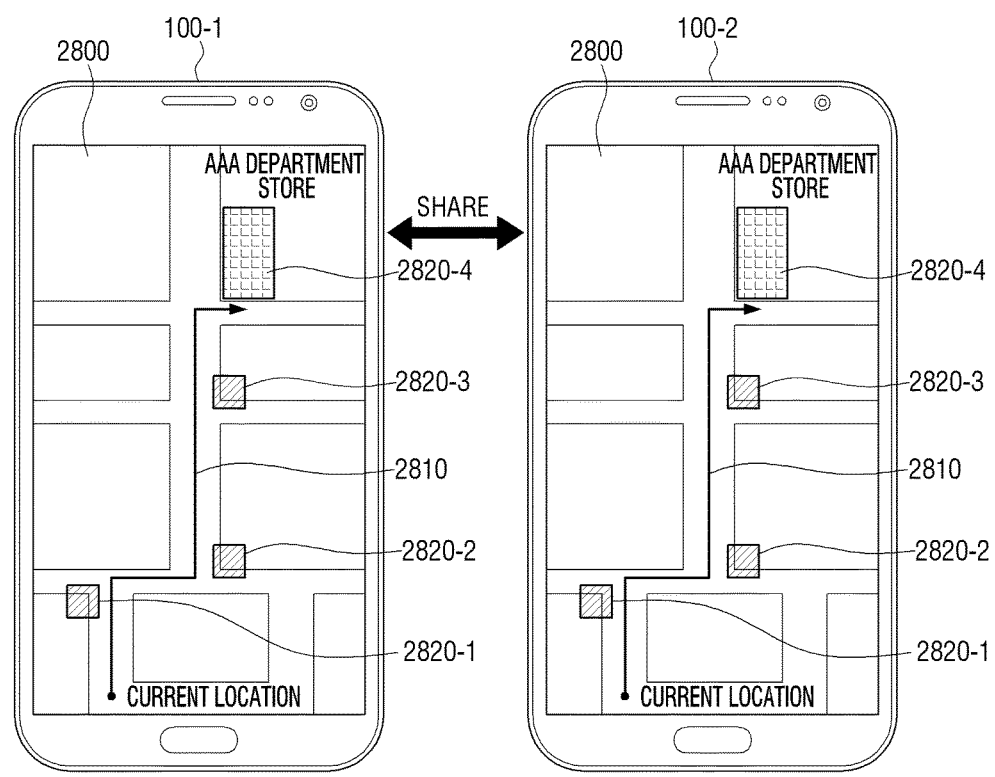

FIG. 28 is a view for explaining a method of sharing data between user terminal devices. According to FIG. 28, a first user terminal device 100-1 may display a map screen 2800 according to a user manipulation. FIG. 28 illustrates a state where the map screen 2800 including a moving route 2810 and a plurality of images 2820-1 to 2820-4 which are seen along the moving route is displayed. Although FIG. 28 illustrates the map screen 2800 including the moving route 2810, a map screen including only an image without a moving route may be displayed when only a location and direction are determined as in the aforementioned other exemplary embodiments.

A user is able to select the map screen 2800 and input a share command. Accordingly, the selected map screen 2800 may be transmitted to a second user terminal device 100-2.

Meanwhile, the controller 130 may share the map screen 2800 through a communication network by using an address list stored in the first user terminal device 100-1 or a telephone number inputted by the user. Alternatively, the controller 130 may share data through various servers.

Hereinafter, a configuration and operations of a network system capable of sharing data by using a server will be explained in detail.

Figure 29:
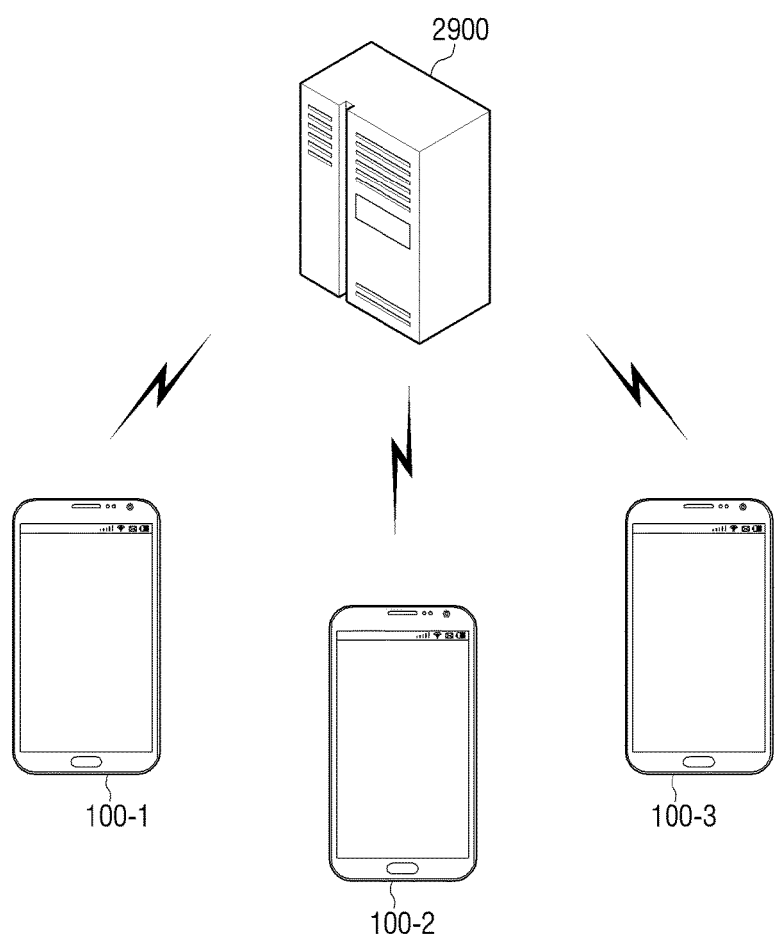
FIG. 29 is a block diagram illustrating a configuration of a network system according to an exemplary embodiment.

FIG. 29 is a view illustrating a configuration of a network system according to an exemplary embodiment. According to FIG. 29, a network system includes a plurality of user terminal devices 100-1 to 100-3 and a server 2900.

Although FIG. 29 illustrates three user terminal devices 100-1 to 100-3 only, the number of user terminal devices may vary. Each of the user terminal devices 100-1 to 100-3 may be implemented as various configurations as described above and a detailed description thereof will be omitted.

The server 2900 may provide each of the user terminal devices 100-1 to 100-3 with an image. To be specific, when a navigation program is executed, and a location and a direction are determined or a moving route is determined within a map, each of the user terminal devices 100-1 to 100-3 requests for an image in a direction corresponding thereto to the server 2900. The server 2900 transmits the requested image to the user terminal devices 100-1 to 100-3.

The server 2900 may be implemented as a web server, a cloud server, and other various servers.

An image to be stored in the server 2900 may be obtained by a business operator who operates the server 2900, or may be uploaded by each of the user terminal devices 100-1 to 100-3 registered in the server 2900.

Figure 30:
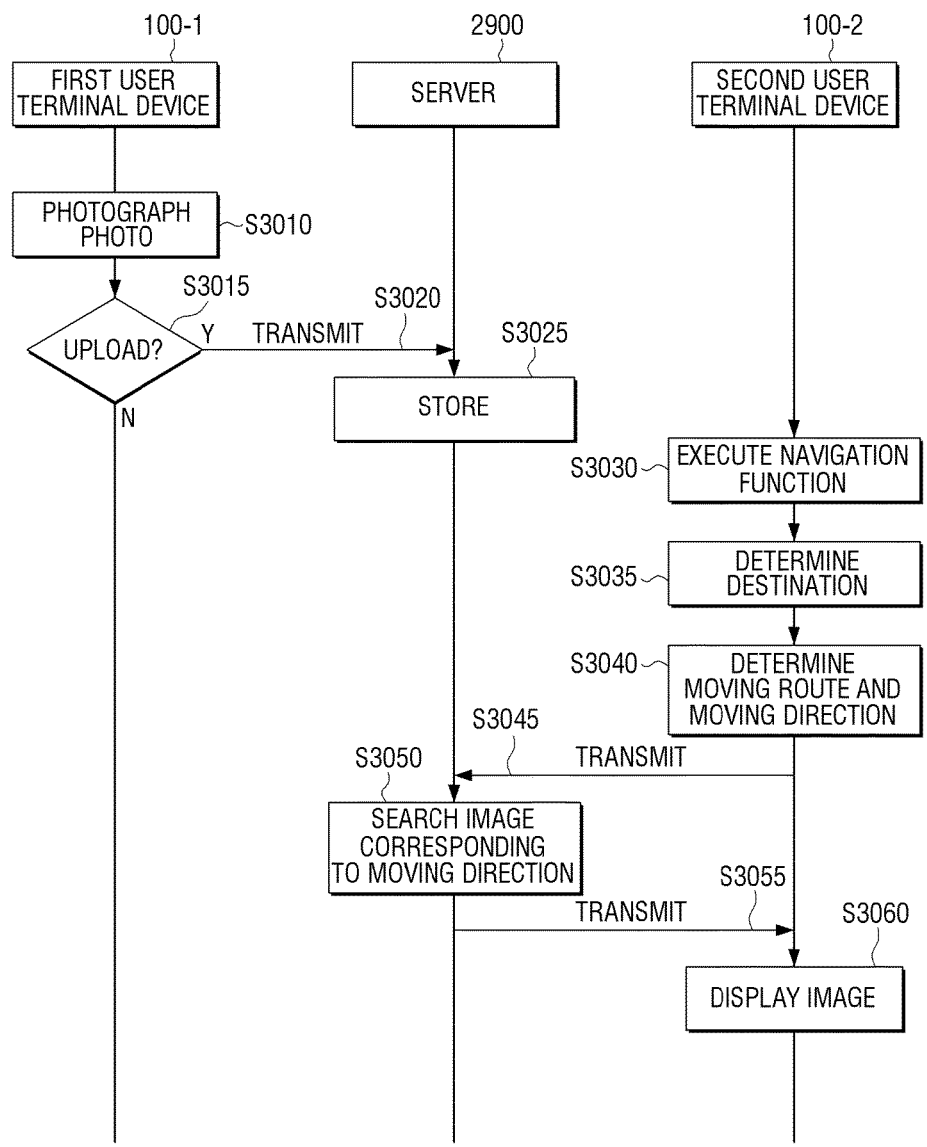
FIG. 30 is a timing diagram for explaining an example of a navigation method in the network system in FIG. 29, according to an exemplary embodiment.

FIG. 30 is a timing diagram for explaining a sharing method which is executed in the network system in FIG. 29.

According to FIG. 30, when images are photographed in the first user terminal device 100-1 which is one of the plurality of user terminal devices connected to the server 2900 (S3010), the photo images may be uploaded to the server 2900 according to a selection of a user (S3015 and S3020). The server 2900 may store the uploaded photo images as an image (S3025). The photo images may include a moving image as well as a still image.

In addition, when photos are photographed, each of the user terminal devices 100-1 to 100-3 may transmit data of the photos along with meta data regarding the photo data. Meta data may include various data such as location coordinate information on a point where the photos are photographed, a photographing date, azimuth information on the user terminal device when the photographing is performed, name of the photos, identification information on a person who photographed the photos, a photographing option which is applied to the photos, and the like.

The server 2900 may store images uploaded by the other user terminal devices 100-2 and 100-3 and meta data thereof as well as those uploaded by the first user terminal device 100-1. The server 2900 may classify and store each of the photo images into various categories such as an area, a business type, a user, and the like.

In this state, when a navigation function is executed in the second user terminal device 100-2 (S3030), and a destination is determined (S3035), the second user terminal device 100-2 may determine a moving route from a current location to the destination and a moving direction thereof (S3040), according to an exemplary embodiment.

The second user terminal device 100-2 transmits information on the determined moving route and moving direction to the server 2900 (S3045). The server 2900 searches an image photographed in a view which is matched with the moving direction among information on the photos photographed at locations included in the moving route (S3050).

The server 2900 transmits the searched image to the second user terminal device 100-2 (S3055). The second user terminal device 100-2 may further display the transmitted image along with the moving route on a map screen (S3060). The method of displaying an image may be implemented variously as specified above.

Meanwhile, although FIG. 30 illustrates that only an image may be uploaded to the server 2900 and used, other moving route information and a map may be uploaded to the server 2900 and shared with other users.

When moving route information is provided, the network system may be a navigation service providing system. That is, the network system may be implemented as various types of system such as a navigation service providing system, a map providing system, a photo providing system, and the like.

Figure 31:
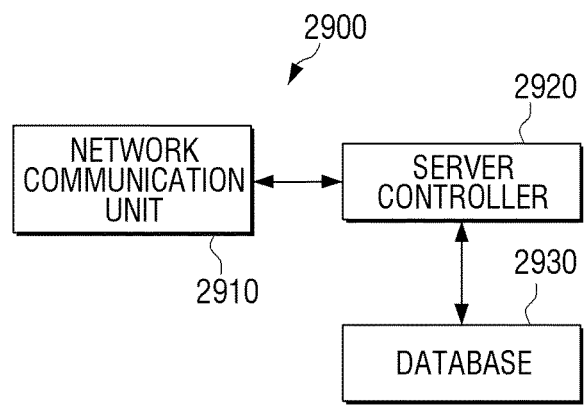
FIG. 31 is a block diagram illustrating a configuration of a server according to an exemplary embodiment.

FIG. 31 is a block diagram illustrating an example of a server which is used in the network system in FIG. 29. According to FIG. 31, the server 2900 includes a network communication unit 2910, a server controller 2920, and a database 2930.

The network communication unit 2910 is a component for performing communication with the user terminal devices 100-1 to 100-3 according to various communication methods.

The database 2930 is a component for storing various data uploaded by users. As explained above, received data may include various data such as image data and meta data thereof, a moving route, destination information, a map, and the like. Besides, a user is able to share various navigation data including a preferred point which is designated as a destination frequently or a preferred route, contact information stored in a user terminal device, and the like through the server 2900.

When various data are uploaded through the network communication unit 2910, the server controller 2920 classifies each data according to meta data, and records the data in the database 2930.

Subsequently, when a request to search for an image is transmitted from a user terminal device which is connected through the network communication unit 2910, the server controller 2920 searches an image corresponding to the search request from the database 2930. In addition, the server controller 2920 transmits the searched image to the user terminal device. As described above, even though a photographing is performed on a single point, a plurality of photos may exist according to a view point. For example, when it is assumed that there are four directions of east, west, south, and north, there may be four images photographed by rotating by 90 degrees according to each point. The server controller 2920 may select only one image corresponding to a moving direction among the images, and may transmit the selected image to the user terminal device. In this case, only one image per point is transmitted, and it is possible to provide images of many points even though a communication band width between user terminal devices is not broad.

Meanwhile, the server 2900 may assign high preference to an image which is downloaded frequently by users. Accordingly, when a moving route includes a periphery of a point, the image having high preference may be provided as an image representing an attraction or a user preferred-place.

Although FIG. 29 to FIG. 31 illustrate a system where the server 2900 stores images, and each user terminal device uploads or downloads the images to the server 2900, a user is able to share various navigation data in other various methods.

That is, it is possible to share navigation data directly between user terminal devices in the NFC method or the Bluetooth method. Alternatively, when the user terminal device 100-1 stores data in the server 2900 and provides another user terminal device 100-2 with a link address of the storage location, the user terminal device 100-2 may receive the navigation data by accessing to the server 2900 directly by using the line address. Specifically, when data is a moving image, it is possible to compress and share the moving image into a low-capacity data by using a compression method such as flash, mov, avi, mpg, and the like. Besides, it is possible to share the navigation data by using a social network service, an e-mail, a text message, and the like.

Meanwhile, as described above, the user terminal device 100 may be implemented as an automotive control system which is mounted on a vehicle among various types of devices.

Figure 32:
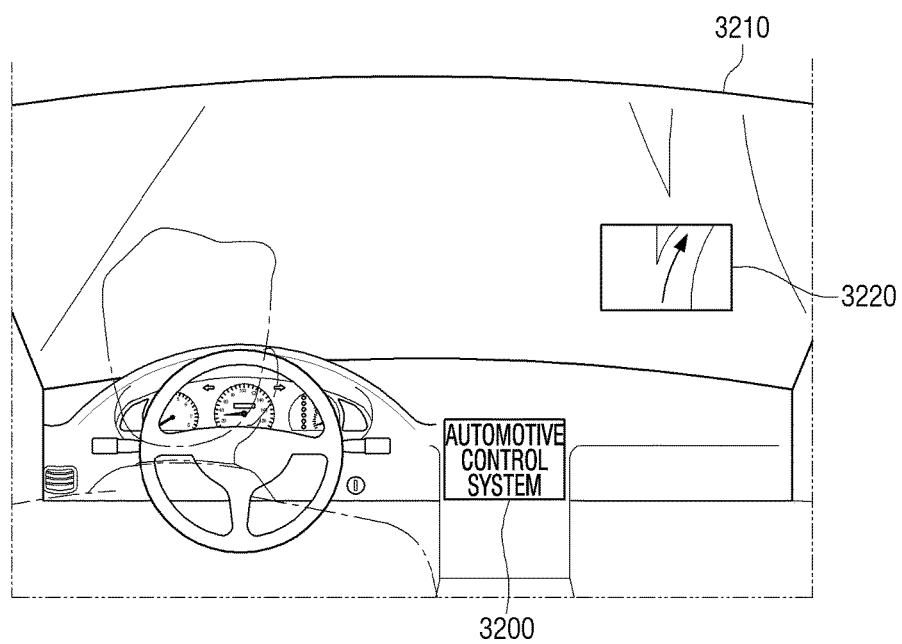
FIG. 32 is a view for explaining an operation of an automotive control system according to an exemplary embodiment.

FIG. 32 is a view for explaining operations of a user terminal device which is implemented as an automotive control system. According to FIG. 32, an automotive control system 3200 may be implemented as a form including a transparent display 3210.

The transparent display 3210 refers to a panel which has transparency and thus, its rear background is reflected. A transparent display device may be implemented using a transparent oxide semiconductor film. FIG. 32 illustrates a case where a front glass window of a vehicle is implemented as the transparent display 3210.

When a user executes a navigation function through an interface (not shown) which is mounted inside a vehicle and inputs a destination, the automotive control system 3200 searches a moving route to the destination. When the moving route is searched, the automotive control system 3200 searches an image corresponding to the moving route and a moving direction thereof from its own storage (not shown) or an external server. The automotive control system 3200 may display a searched image 3220 on the transparent display 3210 at an appropriate point of time.

For example, when there is an image which is photographed on a point A, and a vehicle reaches around the point A, the image photographed on the point A may be displayed. Alternatively, when the vehicle reaches an area where a user deviates from a route frequently, an image corresponding to the area may be displayed.

Figure 33:
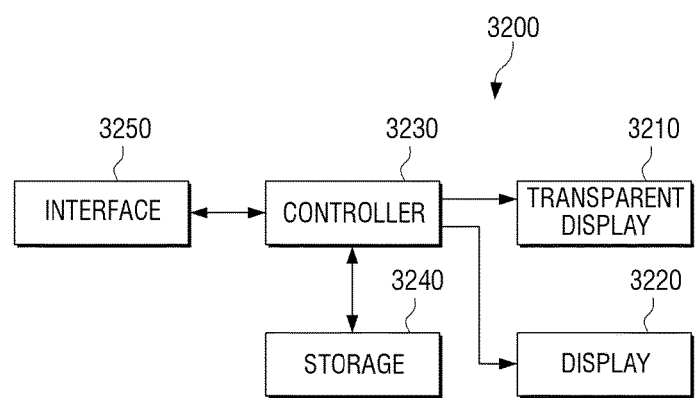
FIG. 33 is a block diagram illustrating a configuration of the automotive control system in FIG. 32, according to an exemplary embodiment.

FIG. 33 is a block diagram illustrating an example of the automotive control system 3200. According to FIG. 33, the automotive control system 3200 includes the transparent display 3210, a display 3220, a controller 3230, a storage 3240, and an interface 3250.

As described above, the transparent display 3210 is a component which may display various objects with the transparency.

The transparent display 3210 may be implemented as various forms such as a transparent LCD type, a transparent Thin-Film Electroluminescent Panel (TFEL) type, a transparent OLED type, a projecting type, and the like.

A transparent LCD type refers to a transparent display device which is implemented by removing a backlight unit from a currently used LCD device and mounting a couple of polarizing plates, an optical film, a transparent thin film transistor, a transparent electrode, and the like. The transparent LCD device has advantages of implementing a large-scaled transparent display while transmittance decreases due to a polarizing plate or an optical film, and an optical efficiency decreases since ambient lights are used instead of a backlight unit. A transparent TFEL type refers to a device which uses an alternating current type-inorganic thin film EL (AC-TFEL) display which is composed of a transparent electrode, an inorganic fluorescent substance, and an insulator film. The AC-TFEL is a display where an accelerated electrode excites a fluorescent substance so as to emit lights with passing through an inorganic fluorescent substance. When the transparent display 3210 is implemented as a transparent TFEL type, the controller 130 may determine a location where information is displayed by adjusting an electrode to be projected to an appropriate location. An inorganic fluorescent substance and an insulator film have transparency, and thus, it is possible to implement very transparent display. Besides, a transparent OLED type refers to a transparent display device which uses an OLED capable of emitting light autonomously. An organic emitting layer is transparent, and thus, when a transparent electrode is employed as both electrodes, it is possible to implement the transparent OLED as a transparent device. The OLED emits a light as an electron and a positive hole and are injected from both sides of the organic emitting layer, in order to be combined with each other within the organic emitting layer. The transparent OLED device displays information as the electron and the positive hole are injected into a desired location based on such principle. A projecting type refers to a device which displays various objects by projecting a light toward a transparent screen by using a light source, a lens, a mirror, and the like. The transparent display 3210 may be implemented as various forms as specified above.

The display 3220 is a component for displaying various interface screens separately from the transparent display 3210. The display 3220 may be disposed on a center fascia of a vehicle.

The storage 3240 may store various programs and data which are used in operating an automotive control system. As an example, the storage 3240 may store a navigation program with a map and navigation data which are used in the navigation program.

The interface 3250 is a component for being connected to various external devices. The interface 3250 may be directly connected to an external device though a USB interface, and may communicate with an external device according to various communication methods including a Bluetooth method, a Wi-Fi method, IEEE, a NFC method, and the like.

The controller 3230 controls overall operations of an automotive control system. When a navigation function is selected by a menu displayed on a screen of the display 3220 or a manipulation of a separate button (not shown), the controller 3230 executes a navigation program stored in the storage 3240. The controller 3230 displays a map screen on the display 3220. In this state, when a user inputs a destination or a moving route, the controller 3230 searches an image corresponding to the moving route and a moving direction thereof from the storage 3240 and an external server. The controller 3230 displays the searched image on the transparent display 3210 separately from the map screen displayed on the display 3220.

In general, a navigation function provided by the automotive control system 3200 is used while a vehicle is running, and thus, a user may not look through an image displayed on the display. Accordingly, the automotive control system 3200 according to the present exemplary embodiment displays an image on the transparent display 3210 so that the user is able to find a right way. To be specific, the controller 3230 may display an image when an accurate route guide is required, for example, when the user is located on an intersection or a point where a course deviation occurs frequently. In addition, the controller 3230 may also display an image on the transparent display 3210 in an environment where visibility is limited due to fog or rain.

Although FIG. 32 and FIG. 33 illustrate a state where an image is displayed on the transparent display 3210, it is possible to display an image to be overlaid with a map screen of the display 3220, in the automotive control system 3200, according to an exemplary embodiment.

Meanwhile, the aforementioned various exemplary embodiments have been described taking a case where an image is added to a map screen in a form of a photo as an example, but the image may be provided as a form of other AR (Augmented Reality) objects than a photo. The AR refers to a technology which synthesizes an object representing a virtual object or information with an actual image or a map screen so as to be seen as an object which exists in an original environment. In addition, a user terminal device may provide a navigation function by interworking with an external device.

Figure 34:
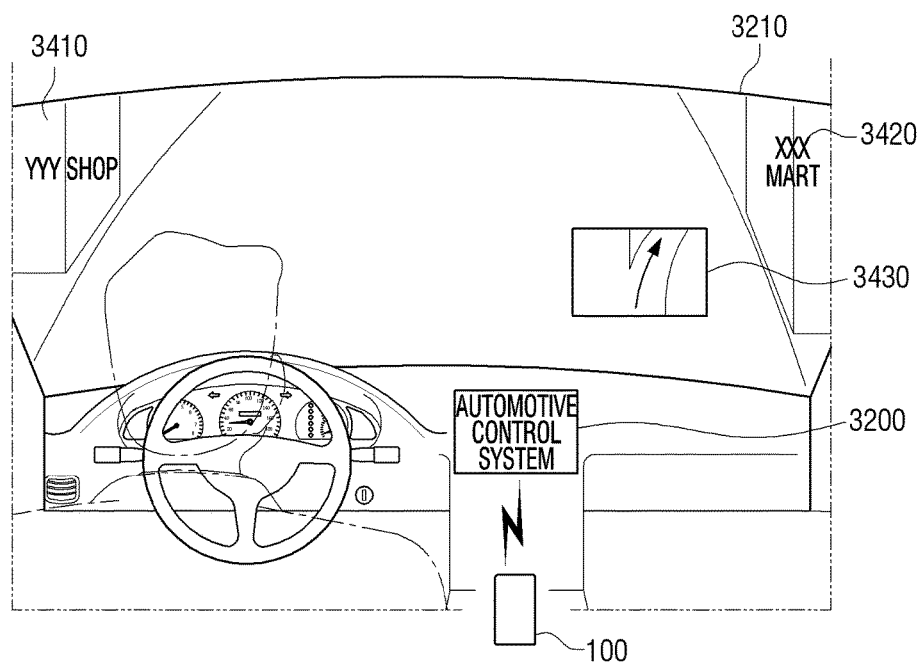
FIG. 34 is a view for explaining an operation of a user terminal device which interacts with an automotive control system according to an exemplary embodiment.

FIG. 34 is a view for explaining a method of performing a navigation function by interworking with an automotive control system.

According to FIG. 34, when a navigation function is executed, the user terminal device 100 determines a current location of the user terminal device 100 by using the GPS chip 161. The user terminal device 100 generates an image and an AR object corresponding to the determined location and a moving direction, and transmits the data to the automotive control system 3200.

The automotive control system 3200 may display various AR objects 3410, 3420 and an image 3430 received from the user terminal device 100 to the transparent display 3210.

The automotive control system 3200 may receive information on various AR objects 3410, 3420 and information on a location where the objects will be displayed and timing thereof from the user terminal device 100, and may display the AR objects 3410, 3420 based on the information.

Figure 35:
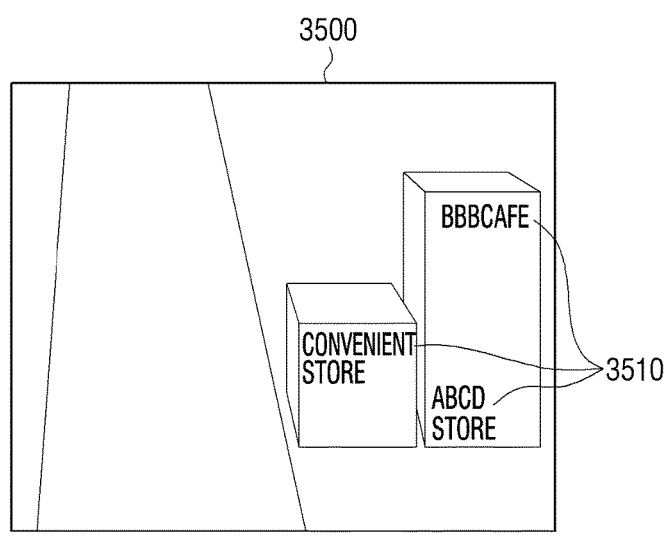
FIG. 35 is a view illustrating an example of an image where an Augmented Reality (AR) object is added according to an exemplary embodiment.

Meanwhile, such AR objects may be displayed to be overlaid with an image which is displayed on the user terminal device 100. FIG. 35 is a view illustrating an operation of the user terminal device 100 according to the exemplary embodiment.

According to FIG. 35, the user terminal device 100 may display an image 3500 which is seen in a particular direction to be overlaid with a map screen or on a side of the map screen. In this case, the controller 130 may also display an AR object 3510 of various buildings or landmarks displayed on the image. To be specific, when a user selects a location and direction or selects a moving route from a map screen, the controller 130 displays an image corresponding to the user manipulation. At this point, the controller 130 receives AR object information regarding surrounding landform from various servers 300, 600, and 2900 based on a point where the image is displayed, and displays the information to be overlaid with the image.

In this case, it is possible to allow a user to select a category regarding a subject to display an AR object thereof so that only an AR object which belongs to the selected category (for example, a store, a restaurant, a theater, a gas station, and the like) may be displayed selectively to be overlaid with the subject.

Alternatively, it is possible to selectively display only AR objects of subjects having a name inputted by the user, or to selectively display only AR objects of subjects having a high preference through a Social Network Service (SNS).

To be specific, in case where it is implemented with the exemplary embodiment of FIG. 4, when a user sets a random location and a random direction within a map screen, the controller may select a subject having a high preference among buildings or landforms which exist in the direction at the location, and may display an AR object of the subject to be overlaid with an image.

Meanwhile, although the aforementioned various exemplary embodiments have described the methods of displaying a still image or a moving image corresponding to a location, a direction, or a moving route selected by the user, other various objects such as an AR object may be displayed.

In addition, although various exemplary embodiments of displaying an image corresponding to a location, a direction, and a moving route selected by a user have been described in detail above, other various options than a location, a direction, and a moving route may be selected. For example, other than a location and a direction, various options such as a user's eye direction, an altitude, a moving speed, a viewing angle, and the like may be also selected. The user terminal device 100 may selectively display images corresponding to the various options.

In addition, an option setting may be performed according to various exemplary embodiments. For example, a UI menu for setting various options may be displayed on a screen. In addition, the option setting may be implemented so that a user selects a menu displayed on a screen or a button disposed on a main body of the user terminal device 100, and then selects various options by dragging the screen. Besides, it may be implemented so that an option is selected according to an area to which a user manipulation is applied, a pressure of the user manipulation, a manipulation speed, a number of points where the user manipulation is performed, and the like.

Figure 36:
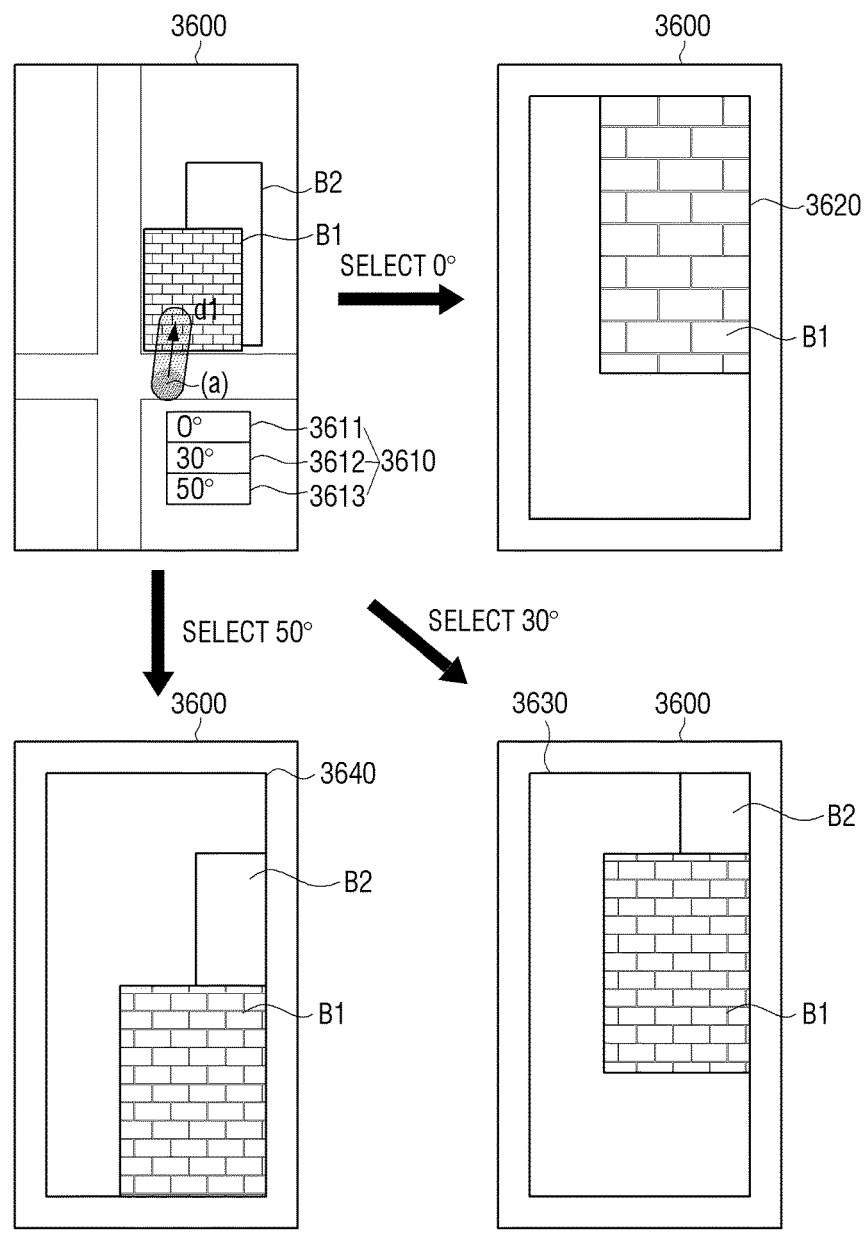
FIG. 36 and FIG. 37 are views illustrating examples of displaying a different image according to an option setting according to an exemplary embodiment.
Figure 37:
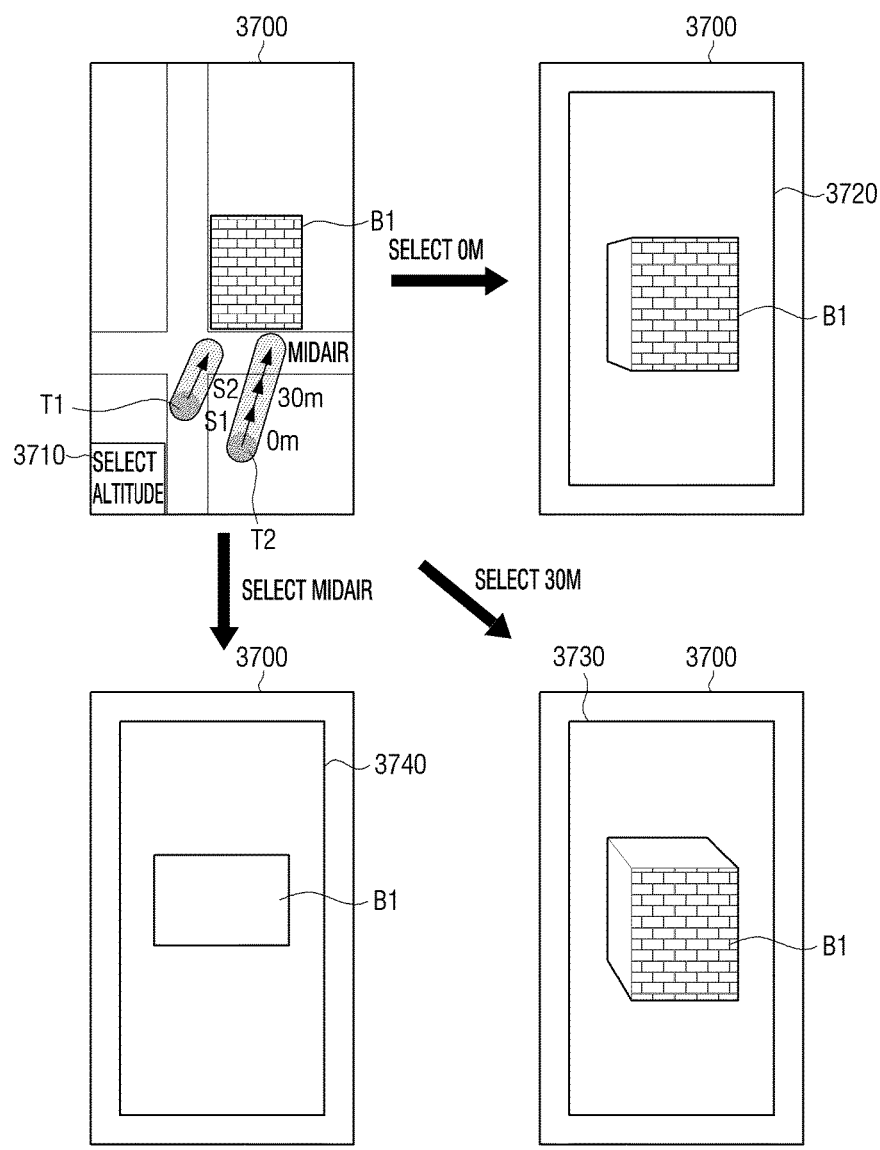

FIG. 36 and FIG. 37 are views regarding an exemplary embodiment of displaying an image corresponding to an additional option, according to an exemplary embodiment.

FIG. 36 illustrates a state where a user touches a random point (a) and selects a random direction (d1) within a map screen 3600. When the location (a) and the direction (d1) are determined according a touch point and a drag direction, the controller 130 displays a UI menu 3610 for selecting an eye direction on a side of the touch point. Although FIG. 36 illustrates only menus 3611, 3612, and 3613 representing 0 degree, 30 degrees, and 50 degrees respectively, a type of the UI menu 3610 is not limited thereto, and the UI menu 3610 may be displayed in various forms and may have various numbers.

In FIG. 36, when a user selects 0 degree menu 3611, the controller 130 displays an image 3620 where objects B1, B2 in the direction (d1) are seen in a direction parallel to an earth surface. To be specific, the controller 130 may transmits information on an eye direction (that is, 0 degree) to the server 300 along with location information and direction information, and thus, may receive and display an image corresponding to the eye direction.

In FIG. 36, when the user selects the 30 degrees menu 3612 or the 50 degrees menu 3613, the controller 130 displays an image 3630 photographed in a direction 30 degrees higher than a degree of an earth surface or an image 3640 photographed in a direction 50 degrees higher than the degree of the earth surface. Accordingly, it is possible to see an upper side of a front building B1 or an appearance of a building B2 which is covered with the front building B1.

FIG. 37 is a view for explaining a method where a user selects an altitude by touching a map screen 3700, according to an exemplary embodiment. According to FIG. 37, a user selects a location and a direction by touching and dragging a random point T1 within the map screen 3700. In addition, the user is able to select a menu 3710 displayed within the map screen 3700. When the menu 3710 is selected, the controller 130 may determine an option value corresponding to the menu 3710 according to a user manipulation T2 which is performed thereafter. That is, when the user manipulation T2 of touching and dragging a screen is performed after the altitude select menu 3710 is selected, the controller 130 determines the dragged distance. The controller 130 may determine the user's altitude according to the dragged distance.

In FIG. 37, when the dragged distance is shorter than a certain distance s1, an altitude is selected as 0 m, when the dragged distance is longer than s1 and shorter than s2, the altitude is selected as 30 m, and when the dragged distance is longer than s2, the altitude is selected as midair. The controller 130 may display an altitude corresponding to the dragged distance of a dragging trace of the user. FIG. 37 illustrates an operation of displaying a message of 0 m when the dragged distance is shorter than the certain distance s1, displaying a message of 30 m when the dragged distance s longer than s1 and shorter than s2, and displaying a message of "midair" when the dragged distance is longer than s2.

When the user dragging is released, the controller 130 selects an altitude corresponding to the dragged distance until the dragging operation is released. In FIG. 37, when the altitude of 0 m is selected, the controller 130 displays an image 3720 which is seen from the earth's surface on the map screen 3700. When the altitude of 30 m is selected, the controller 130 displays an image 3730 which is seen on a location 30 m higher than the earth's surface on the map screen 3700. When the region corresponding to midair is selected, the controller 130 displays an image 3740 which is seen at the region corresponding to midair.

As described above, the controller 130 may transmit information on a location, a direction, and an altitude selected by a user to the server 300, and may receive and display an image corresponding thereto from the server 300.

Other than the above, there may be various options, and a method of selecting an option may be modified variously according to an exemplary embodiment.

As above, a user terminal device may provide various services by being implemented as various forms. The aforementioned exemplary embodiments may be implemented by being combined with each other, if necessary.

A display method or a navigation method of the user terminal device according to the aforementioned various exemplary embodiments may be stored in a non-transitory readable medium. The non-transitory readable medium may be used by being mounted on various devices.

As an example, a program code for performing operations of displaying a map screen, sensing a user manipulation, and when a destination is determined by the user manipulation, additionally displaying a moving route to the destination and an image which is seen in a direction of the moving route on the map may be stored in the non-transitory readable medium and provided.

In addition, when a location and a direction are determined within the map by the operations of displaying a map and sensing a user manipulation and the user manipulation, a program code for performing operations of selecting an image photographed in a determined direction at a determined location, and additionally displaying the selected image on the map may be stored in the non-transitory readable medium and provided.

The non-transitory computer readable medium is not a medium that stores data for a short period, such as a register, a cache, or a memory, but instead is a medium which semi-permanently stores data and is readable by a device. To be specific, the non-transitory computer readable medium may be a compact disc (CD), a digital versatile disk (DVD), a hard disk, a Blu-ray disk, a universal serial bus (USB), a memory card, and a read-only memory (ROM), and the like. In addition, as given above, although a few desirable exemplary embodiments have been shown and described, the present disclosure is not limited to the aforementioned particular exemplary embodiments, and could be variously modified and achieved by those skilled in the art to which the present disclosure pertains without deviating from the substance of the present disclosure which is claimed in the claims, and such modifications should not be understood separately from the technical concept or prospect of the present disclosure.

What is claimed is:

1. A user terminal device comprising:
a display configured to display a map screen;
a detector configured to detect a user manipulation; and
a controller configured to, when a route is input by the user manipulation on the map screen, display a photographic image which is selected based on the route,
wherein when a line is drawn by the user manipulation on the map screen, the controller determines a moving route based on a direction of a trace of the line and displays a photographic image corresponding to the direction of the trace of the line along with the moving route,
wherein the photographic image is an image photographed in a direction corresponding to the direction of the trace of the line, and
wherein the moving route is determined by comparing the trace of the line with road information on the map screen and by setting, in response to determining that the trace of the line is inconsistent with an actual road, a road which is close to the line as the moving route.

2. The device as claimed in claim 1, wherein the controller configured to, when a location and the route are input by the user manipulation on the map screen, display the photographic image which is viewable based on a position and a direction corresponding to the route.

3. The device as claimed in claim 1, wherein the controller configured to, when a location and a direction are input by the user manipulation on the map screen, display the photographic image which is viewable based on the location and the direction.

4. The device as claimed in claim 3, wherein when the route on the map screen is input by the user manipulation, the controller is configured to display a plurality of photographic images corresponding to a plurality of locations along the route, the plurality of photographic images corresponding to a direction of the route at the plurality of locations.

5. The device as claimed in claim 3, wherein the controller displays a plurality of photographic images sequentially.

6. The device as claimed in claim 3, wherein when a destination is determined according to the user manipulation, the controller displays a moving route from a current location of the user terminal device to the destination on the map screen, and additionally displays at least one photographic image in a direction of the moving route on the map screen, from among a plurality of photographic images corresponding to the moving route.

7. The device as claimed in claim 3, wherein the user manipulation includes a text being drawn by the user on the map screen, the controller is configured to determine a destination by recognizing the text, and the controller is configured to search for a moving route from a current location to the destination automatically.

8. The device as claimed in claim 5, wherein the user manipulation includes a pen hovering manipulation moving along the moving route, and the controller displays photographic images in a moving direction at each point on the moving route sequentially according to the pen hovering manipulation.

9. The device as claimed in claim 5, wherein the controller is configured to select points from the moving route which meet a predetermined condition, and the controller is configured to display at least one photographic image in a direction of the moving route at each selected point.

10. The device as claimed in claim 3, wherein the user manipulation includes a touch point and a dragging or flicking manipulation,
wherein when the user manipulation is dragged or flicked in a certain direction on the map screen after it is touched, the controller determines the location based on the touch point, and determines the direction based on the dragged direction or the flicked direction.

11. The device as claimed in claim 10, wherein the controller is configured to select at least one from among a magnification, a size, a display location, and a photographing angle based on at least one from among a touch intensity, a touch area, a touch time, a moving distance of the user manipulation, and a moving speed of the user manipulation, and is configured to display a selected photographic image on the map screen.

12. The device as claimed in claim 10, wherein the user manipulation further includes a manipulation using a pen.

13. The device as claimed in claim 3, further comprising:
a storage;
wherein the controller is configured to select a photographic image corresponding to the location and the direction from among the photographic images stored in the storage.

14. The device as claimed in claim 3, further comprising:
a communication unit configured to communicate with a server;

wherein the controller is configured to search and download a photographic image corresponding to the location and the direction from the server, and the controller is configured to download the photographic image to the map screen.

15. The device as claimed in claim 3, further comprising:
a storage; and
a communication unit configured to communicate with a server;
wherein the controller is configured to detect the photographic image corresponding to the location and the direction from at least one from among the storage and the server, and
when a plurality of photographic images are detected, the controller is configured to display the plurality of photographic images consecutively.

16. The device as claimed in claim 3, wherein a share command is inputted via the detector, and the controller is configured to transmit the photographic image to other user terminal devices by using a communication unit.

17. The device as claimed in claim 3, wherein the controller is configured to display the photographic image by overlaying the image on the map screen at the location corresponding to the image.

18. The device as claimed in claim 3, wherein the controller is configured to display the photographic image as a separate screen from the map screen.

19. A display method of a user terminal device, comprising:
displaying a map screen;
detecting a user manipulation; and
when a route is input by the user manipulation on the map screen, displaying a photographic image which is selected based on the route,
wherein when a line is drawn by the user manipulation on the map screen, determining a moving route based on a direction of a trace of the line and displaying a photographic image corresponding to the direction of the trace of the line along with the moving route,
wherein the photographic image is an image photographed in a direction corresponding to the direction of the trace of the line, and
wherein the moving route is determined by comparing the trace of the line with road information on the map screen and by setting, in response to determining that the trace of the line is inconsistent with an actual road, a road which is close to the line as the moving route.

20. The method as claimed in claim 19, further comprising:
when a location and the route are input by the user manipulation on the map screen, displaying the photographic image which is viewable based on the position and a direction corresponding to the route.

21. The method as claimed in claim 19, further comprising:
when a location and a direction are input by the user manipulation on the map screen, displaying the photographic image which is viewable based on the location and the direction.

22. The method as claimed in claim 19, further comprising:
when the route on the map screen is input by the user manipulation, displaying a plurality of photographic images corresponding to a plurality of locations along the route, the plurality of images corresponding to a direction of the route at the plurality of locations.

23. The method as claimed in claim 22, wherein the plurality of photographic images are displayed sequentially.

24. The method as claimed in claim 19, further comprising:
displaying a moving route from a current location of the user terminal device to a destination on the map screen when a destination is determined according to the user manipulation; and
displaying at least one photographic image in a direction of the moving route from among a plurality of photographic images corresponding to the moving route on the map screen.

25. The method as claimed in claim 24, further comprising:
determining the destination by recognizing a text when the text is drawn by the user manipulation on the map screen; and
searching a moving route from the current location of the user terminal device to the destination automatically.

26. The method as claimed in claim 20, wherein the displaying the photographic image further comprises:
sequentially displaying photographic images in a moving direction at each point on the moving route according to the user manipulation, when the user manipulation moving along the moving route is detected.

27. The method as claimed in claim 26, wherein the user manipulation includes a pen hovering manipulation.

28. The method as claimed in claim 24, wherein the displaying the selected photographic image on the map screen further comprises:
selecting points from the moving route which meet a predetermined condition; and
displaying a photographic image in the moving direction at each selected point.

29. The method as claimed in claim 21, further comprising:
searching a photographic image corresponding to the location and the direction from a storage of the user terminal device or an external server.

30. The method as claimed in claim 29, wherein when the plurality of photographic images are detected, the displaying comprises:
displaying the plurality of photographic images consecutively.

31. The method as claimed in claim 19, further comprising:
inputting a share command; and
transmitting the photographic image to other user terminal devices according to the share command;
wherein when information on a moving route and a moving direction is transmitted from a user terminal device from among the plurality of user terminal devices, the server searches an image photographed in the moving direction at a plurality of points along the moving route from among prestored photographed images, and the server transmits the searched photographed image to the user terminal device.

32. A device comprising:
a display configured to display at least one image;
a detector configured to sense an input; and
a controller configured to control the displaying of the at least one image based on the input, wherein the input corresponds to at least one location and at least one direction,
wherein when a line is drawn by user manipulation on a map screen, the controller determines a moving route based on a direction of a trace of the line and controls the displaying of a photographic image corresponding to the direction of the trace of the line along with the moving route,
wherein the photographic image is an image photographed in a direction corresponding to the direction of the trace of the line, and
wherein the moving route is determined by comparing the trace of the line with road information on the map screen and by setting, in response to determining that the trace of the line is inconsistent with an actual road, a road which is close to the line as the moving route.

33. The device according to claim 32, wherein the location includes a destination for a moving route and the at least one image includes at least one from among at least one photograph and at least one map.

34. The device according to claim 33, wherein the controller is configured to display the at least one photograph indicating a distance between the device and a surface of the ground at the at least one location according to the input.

35. The device according to claim 33, wherein the input is one from among a user touch, a pen, a hovering manipulation, and a voice command.

36. A display method, comprising:
displaying at least one image;
sensing an input; and
controlling the displaying of the at least one image based on the input, wherein the input indicates at least one location and at least one direction,
determining a moving route based on a direction of a trace of a line drawn by a user manipulation on the displayed at least one image; and
displaying a photographic image corresponding to the direction of the trace of the line along with the moving route,
wherein the photographic image is an image photographed in a direction corresponding to the direction of the trace of the line, and
wherein the moving route is determined by comparing the trace of the line with road information on map screen and by setting, in response to determining that the trace of the line is inconsistent with an actual road, a road which is close to the line as the moving route.

37. The method according to claim 36, wherein the location includes a destination for a moving route and the at least one image includes at least one from among at least one photograph and at least one map.

38. The method according to claim 37, further comprising:
displaying the at least one photograph indicating a distance between a device and a surface of the ground at the at least one location according to the input.

39. The method according to claim 37, wherein the input is one from among a user touch, a pen, a hovering manipulation, and a voice command.

* * * * *